(12) United States Patent
Lavoie

(10) Patent No.: US 10,112,646 B2
(45) Date of Patent: Oct. 30, 2018

(54) TURN RECOVERY HUMAN MACHINE INTERFACE FOR TRAILER BACKUP ASSIST

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/146,933

(22) Filed: May 5, 2016

(65) Prior Publication Data

US 2017/0320518 A1    Nov. 9, 2017

(51) Int. Cl.
| | |
|---|---|
| *B62D 13/06* | (2006.01) |
| *B60K 35/00* | (2006.01) |
| *B62D 15/02* | (2006.01) |
| *B60R 1/00* | (2006.01) |

(52) U.S. Cl.
CPC .............. *B62D 13/06* (2013.01); *B60K 35/00* (2013.01); *B62D 15/029* (2013.01); *B60R 1/00* (2013.01); *B60R 2300/8086* (2013.01)

(58) Field of Classification Search
CPC ................ B62D 5/0448; B62D 5/0481; B62D 15/0235; B62D 5/0418; B62D 13/06; B62D 15/0285; B62D 6/002; B62D 13/04; B62D 15/02; B62D 1/22; B60K 2350/2052; B60K 2350/92; B60K 2350/2017; B60K 2350/1024
USPC .................................. 1/1; 701/117; 348/148
See application file for complete search history.

(56) References Cited

U.S. PATENT DOCUMENTS

| | | | |
|---|---|---|---|
| 3,605,088 | A | 9/1971 | Savelli |
| 3,833,928 | A | 9/1974 | Gavit et al. |
| 3,924,257 | A | 12/1975 | Roberts |
| 4,044,706 | A | 8/1977 | Gill |
| 4,430,637 | A | 2/1984 | Koch-Ducker et al. |

(Continued)

FOREIGN PATENT DOCUMENTS

| | | |
|---|---|---|
| CN | 101610420 A | 12/2009 |
| CN | 101833869 A | 9/2010 |

(Continued)

OTHER PUBLICATIONS

Jung-Hoon Hwang, Ronald C. Arkin, and Dong-Soo Kwon; "Mobile robots at your fingertip: Bezier curve on-line trajectory generation for supervisory control," IEEE/RSJ, International Conference on Intelligent Robots and Systems, Las Vegas, Nevada, Oct. 2003, 6 pages.

(Continued)

*Primary Examiner* — Courtney D Heinle
*Assistant Examiner* — Luis A Martinez Borrero
(74) *Attorney, Agent, or Firm* — Frank MacKenzie; Price Heneveld LLP

(57) ABSTRACT

A backup assist system for a vehicle reversing a trailer includes an input receiving a backing command and outputting a control signal based thereon. A controller receives the control signal, generates a vehicle steering command based on the control signal, and determines a length of a recovery period based on the control signal. The system also includes an interface outputting an indication of the length of the recovery period.

20 Claims, 11 Drawing Sheets

(56) References Cited

U.S. PATENT DOCUMENTS

| | | | |
|---|---|---|---|
| 4,846,094 | A | 7/1989 | Woods |
| 4,848,499 | A | 7/1989 | Martinet et al. |
| 4,897,642 | A | 1/1990 | DiLullo et al. |
| 4,947,097 | A | 8/1990 | Tao |
| 5,097,250 | A | 3/1992 | Hernandez |
| 5,132,851 | A | 7/1992 | Bomar et al. |
| 5,155,683 | A | 10/1992 | Rahim |
| 5,191,328 | A | 3/1993 | Nelson |
| 5,235,316 | A | 8/1993 | Qualizza |
| 5,247,442 | A | 9/1993 | Kendall |
| 5,455,557 | A | 10/1995 | Noll et al. |
| 5,461,357 | A | 10/1995 | Yoshioka et al. |
| 5,650,764 | A | 7/1997 | McCullough |
| 5,690,347 | A | 11/1997 | Juergens et al. |
| 5,734,336 | A | 3/1998 | Smithline |
| 5,781,662 | A | 7/1998 | Mori et al. |
| 5,905,433 | A | 5/1999 | Wortham |
| 5,951,035 | A | 9/1999 | Phillips, Jr. et al. |
| 5,957,232 | A | 9/1999 | Shimizu et al. |
| 5,999,091 | A | 12/1999 | Wortham |
| 6,041,582 | A | 3/2000 | Tiede et al. |
| 6,100,795 | A | 8/2000 | Otterbacher et al. |
| 6,178,650 | B1 | 1/2001 | Thibodeaux |
| 6,182,010 | B1 | 1/2001 | Berstis |
| 6,198,992 | B1 | 3/2001 | Winslow |
| 6,226,226 | B1 | 5/2001 | Lill et al. |
| 6,292,094 | B1 * | 9/2001 | Deng .............. B62D 7/159 340/431 |
| 6,351,698 | B1 | 2/2002 | Kubota et al. |
| 6,366,202 | B1 | 4/2002 | Rosenthal |
| 6,411,898 | B2 | 6/2002 | Ishida et al. |
| 6,434,486 | B1 | 8/2002 | Studt et al. |
| 6,480,104 | B1 | 11/2002 | Wall et al. |
| 6,483,429 | B1 | 11/2002 | Yasui et al. |
| 6,526,335 | B1 | 2/2003 | Treyz et al. |
| 6,539,288 | B2 | 3/2003 | Ishida et al. |
| 6,573,833 | B1 | 6/2003 | Rosenthal |
| 6,577,952 | B2 | 6/2003 | Geier et al. |
| 6,580,984 | B2 | 6/2003 | Fecher et al. |
| 6,604,592 | B2 | 8/2003 | Pietsch et al. |
| 6,643,576 | B1 | 11/2003 | O Connor et al. |
| 6,683,539 | B2 | 1/2004 | Trajkovic et al. |
| 6,801,125 | B1 | 10/2004 | McGregor et al. |
| 6,816,765 | B2 | 11/2004 | Yamamoto et al. |
| 6,837,432 | B2 | 1/2005 | Tsikos et al. |
| 6,847,916 | B1 | 1/2005 | Ying |
| 6,857,494 | B2 | 2/2005 | Kobayashi et al. |
| 6,933,837 | B2 | 8/2005 | Gunderson et al. |
| 6,959,970 | B2 | 11/2005 | Tseng |
| 6,970,184 | B2 | 11/2005 | Hirama et al. |
| 6,989,739 | B2 | 1/2006 | Li |
| 7,005,974 | B2 | 2/2006 | McMahon et al. |
| 7,026,957 | B2 | 4/2006 | Rubenstein |
| 7,047,117 | B2 | 5/2006 | Akiyama et al. |
| 7,085,634 | B2 | 8/2006 | Endo et al. |
| 7,089,101 | B2 | 8/2006 | Fischer et al. |
| 7,127,339 | B2 * | 10/2006 | Iwazaki .............. B60R 1/00 701/36 |
| 7,136,754 | B2 | 11/2006 | Hahn et al. |
| 7,142,098 | B2 | 11/2006 | Lang et al. |
| 7,154,385 | B2 * | 12/2006 | Lee .............. B62D 5/008 340/431 |
| 7,161,616 | B1 | 1/2007 | Okamoto et al. |
| 7,175,194 | B2 | 2/2007 | Ball |
| 7,204,504 | B2 | 4/2007 | Gehring et al. |
| 7,207,041 | B2 | 4/2007 | Elson et al. |
| 7,220,217 | B2 | 5/2007 | Tamai et al. |
| 7,225,891 | B2 | 6/2007 | Gehring et al. |
| 7,229,139 | B2 | 6/2007 | Lu et al. |
| 7,239,958 | B2 | 7/2007 | Grougan et al. |
| 7,266,435 | B2 | 9/2007 | Wang et al. |
| 7,309,075 | B2 | 12/2007 | Ramsey et al. |
| 7,319,927 | B1 | 1/2008 | Sun et al. |
| 7,352,388 | B2 | 4/2008 | Miwa et al. |
| 7,353,110 | B2 | 4/2008 | Kim |
| 7,366,892 | B2 | 4/2008 | Spaur et al. |
| 7,401,871 | B2 | 7/2008 | Lu et al. |
| 7,425,889 | B2 | 9/2008 | Widmann et al. |
| 7,451,020 | B2 | 11/2008 | Goetting et al. |
| 7,463,137 | B2 | 12/2008 | Wishart et al. |
| 7,505,784 | B2 | 3/2009 | Barbera |
| 7,537,256 | B2 | 5/2009 | Gates et al. |
| 7,552,009 | B2 | 6/2009 | Nelson |
| 7,602,782 | B2 | 10/2009 | Doviak et al. |
| 7,623,952 | B2 | 11/2009 | Unruh et al. |
| 7,640,180 | B1 | 12/2009 | Shimizu et al. |
| 7,689,253 | B2 | 3/2010 | Basir |
| 7,690,737 | B2 | 4/2010 | Lu |
| 7,692,557 | B2 | 4/2010 | Medina et al. |
| 7,693,661 | B2 | 4/2010 | Iwasaka |
| 7,715,953 | B2 | 5/2010 | Shepard |
| 7,777,615 | B2 | 8/2010 | Okuda et al. |
| 7,783,699 | B2 | 8/2010 | Rasin et al. |
| 7,786,849 | B2 | 8/2010 | Buckley |
| 7,801,941 | B2 | 9/2010 | Conneely et al. |
| 7,813,855 | B2 * | 10/2010 | Watanabe .......... B62D 15/0285 180/204 |
| 7,825,782 | B2 | 11/2010 | Hermann |
| 7,827,047 | B2 | 11/2010 | Anderson et al. |
| 7,840,347 | B2 | 11/2010 | Noguchi |
| 7,904,222 | B2 | 3/2011 | Lee et al. |
| 7,907,975 | B2 | 3/2011 | Sakamoto et al. |
| 7,917,081 | B2 | 3/2011 | Voto et al. |
| 7,932,623 | B2 | 4/2011 | Burlak et al. |
| 7,932,815 | B2 | 4/2011 | Martinez et al. |
| 7,950,751 | B2 | 5/2011 | Offerle et al. |
| 7,969,326 | B2 | 6/2011 | Sakakibara |
| 7,974,444 | B2 | 7/2011 | Hongo |
| 8,009,025 | B2 | 8/2011 | Engstrom et al. |
| 8,010,252 | B2 | 8/2011 | Getman et al. |
| 8,019,592 | B2 | 9/2011 | Fukuoka et al. |
| 8,024,743 | B2 | 9/2011 | Werner |
| 8,033,955 | B2 | 10/2011 | FarNsworth |
| 8,036,792 | B2 | 10/2011 | Dechamp |
| 8,037,500 | B2 | 10/2011 | Margis et al. |
| 8,038,166 | B1 | 10/2011 | Piesinger |
| 8,044,776 | B2 | 10/2011 | Schofield et al. |
| 8,044,779 | B2 | 10/2011 | Hahn et al. |
| 8,116,921 | B2 * | 2/2012 | Ferrin .............. G05D 1/0227 242/390.8 |
| 8,121,802 | B2 | 2/2012 | Grider et al. |
| 8,131,458 | B1 | 3/2012 | Zilka |
| 8,138,899 | B2 | 3/2012 | Ghneim |
| 8,140,138 | B2 | 3/2012 | Chrumka |
| 8,150,474 | B2 | 4/2012 | Saito et al. |
| 8,165,770 | B2 | 4/2012 | Getman et al. |
| 8,169,341 | B2 | 5/2012 | Toledo et al. |
| 8,174,576 | B2 | 5/2012 | Akatsuka et al. |
| 8,179,238 | B2 | 5/2012 | Roberts, Sr. et al. |
| 8,195,145 | B2 | 6/2012 | Angelhag |
| 8,205,704 | B2 | 6/2012 | Kadowaki et al. |
| 8,244,442 | B2 | 8/2012 | Craig et al. |
| 8,245,270 | B2 | 8/2012 | Cooperstein et al. |
| 8,255,007 | B2 | 8/2012 | Saito et al. |
| 8,267,485 | B2 | 9/2012 | Barlsen et al. |
| 8,270,933 | B2 | 9/2012 | Riemer et al. |
| 8,280,607 | B2 | 10/2012 | Gatti et al. |
| 8,308,182 | B2 | 11/2012 | Ortmann et al. |
| 8,310,353 | B2 | 11/2012 | Hinninger et al. |
| 8,315,617 | B2 | 11/2012 | Tadayon et al. |
| 8,319,618 | B2 | 11/2012 | Gomi et al. |
| 8,319,663 | B2 | 11/2012 | Von Reyher et al. |
| 8,352,575 | B2 | 1/2013 | Samaha |
| 8,362,888 | B2 | 1/2013 | Roberts, Sr. et al. |
| 8,370,056 | B2 | 2/2013 | Trombley et al. |
| 8,374,749 | B2 | 2/2013 | Tanaka |
| 8,380,416 | B2 | 2/2013 | Offerle et al. |
| 8,392,066 | B2 | 3/2013 | Ehara et al. |
| 8,401,744 | B2 | 3/2013 | Chiocco |
| 8,406,956 | B2 | 3/2013 | Wey et al. |
| 8,417,263 | B2 | 4/2013 | Jenkins et al. |
| 8,417,417 | B2 | 4/2013 | Chen et al. |
| 8,417,444 | B2 | 4/2013 | Smid et al. |
| 8,427,288 | B2 | 4/2013 | Schofield et al. |

(56) References Cited

U.S. PATENT DOCUMENTS

| | | |
|---|---|---|
| 8,451,107 B2 | 5/2013 | Lu et al. |
| 8,471,691 B2 | 6/2013 | Zhang et al. |
| 8,473,575 B2 | 6/2013 | Marchwicki et al. |
| 8,494,439 B2 | 7/2013 | Faenger |
| 8,498,757 B2 | 7/2013 | Bowden et al. |
| 8,538,785 B2 | 9/2013 | Coleman et al. |
| 8,548,680 B2 | 10/2013 | Ryerson et al. |
| 8,560,175 B2 | 10/2013 | Bammert et al. |
| 8,571,758 B2 | 10/2013 | Klier et al. |
| 8,626,382 B2 | 1/2014 | Obradovich |
| 8,755,984 B2 | 6/2014 | Rupp et al. |
| 8,786,417 B2 | 7/2014 | Holmen et al. |
| 8,788,204 B2 | 7/2014 | Shimizu |
| 8,797,190 B2 | 8/2014 | Kolbe et al. |
| 8,798,860 B2 * | 8/2014 | Dechamp ............... B62D 13/06 180/204 |
| 8,807,261 B2 | 8/2014 | Subrt et al. |
| 8,823,796 B2 | 9/2014 | Shen et al. |
| 8,825,221 B2 | 9/2014 | Hueger et al. |
| 8,868,329 B2 | 10/2014 | Ikeda et al. |
| 8,888,120 B2 | 11/2014 | Trevino |
| 8,892,360 B2 | 11/2014 | Otani |
| 8,909,426 B2 * | 12/2014 | Rhode ..................... B62D 1/22 280/426 |
| 8,928,757 B2 | 1/2015 | Maekawa et al. |
| 8,930,140 B2 | 1/2015 | Trombley et al. |
| 9,008,913 B1 | 4/2015 | Sears et al. |
| 9,013,286 B2 | 4/2015 | Chen et al. |
| 9,042,603 B2 | 5/2015 | Elwart et al. |
| 9,082,315 B2 | 7/2015 | Lin et al. |
| 9,094,583 B2 | 7/2015 | Shih et al. |
| 9,102,271 B2 | 8/2015 | Trombley et al. |
| 9,108,598 B2 * | 8/2015 | Headley ................ B60D 1/245 |
| 9,114,832 B2 | 8/2015 | Wang et al. |
| 9,120,359 B2 | 9/2015 | Chiu et al. |
| 9,129,528 B2 * | 9/2015 | Lavoie ................ G08G 1/0962 |
| 9,132,856 B2 | 9/2015 | Shepard |
| 9,187,124 B2 * | 11/2015 | Trombley ............ B62D 15/027 |
| 9,208,686 B2 | 12/2015 | Takamatsu |
| 9,227,474 B2 | 1/2016 | Liu |
| 9,238,483 B2 | 1/2016 | Hafner et al. |
| 9,248,858 B2 | 2/2016 | Lavoie et al. |
| 9,315,212 B1 | 4/2016 | Kyrtsos et al. |
| 9,321,483 B2 | 4/2016 | Headley |
| 9,335,162 B2 | 5/2016 | Kyrtsos et al. |
| 9,352,777 B2 | 5/2016 | Lavoie et al. |
| 9,393,996 B2 * | 7/2016 | Goswami ............. B62D 13/005 |
| 9,428,220 B2 * | 8/2016 | Hueger ................ B62D 13/06 |
| 9,434,414 B2 | 9/2016 | Lavoie |
| 9,493,187 B2 * | 11/2016 | Pilutti ................ B62D 15/027 |
| 9,499,018 B2 | 11/2016 | Gehrke et al. |
| 9,500,497 B2 | 11/2016 | Lavoie et al. |
| 9,508,189 B2 | 11/2016 | Han et al. |
| 9,533,683 B2 * | 1/2017 | Lavoie ................ B60W 10/18 |
| 9,566,911 B2 * | 2/2017 | Greenwood ............. B60R 1/00 |
| 9,610,974 B2 * | 4/2017 | Herzog ................ B62D 13/06 |
| 9,616,928 B2 * | 4/2017 | Lavoie .............. B62D 15/0285 |
| 9,623,904 B2 * | 4/2017 | Lavoie ................ B62D 13/06 |
| 9,676,377 B2 | 6/2017 | Hafner et al. |
| 9,783,230 B2 * | 10/2017 | Hafner ................ B62D 13/06 |
| 9,798,953 B2 * | 10/2017 | Hu ...................... G06K 9/6202 |
| 9,836,060 B2 * | 12/2017 | Ghneim ................ B60W 10/04 |
| 2002/0005780 A1 | 1/2002 | Ehrlich et al. |
| 2002/0098853 A1 | 7/2002 | Chrumka |
| 2002/0111118 A1 | 8/2002 | Klitsner et al. |
| 2003/0079123 A1 | 4/2003 | Mas Ribes |
| 2003/0147534 A1 | 8/2003 | Ablay et al. |
| 2003/0222982 A1 | 12/2003 | Hamdan et al. |
| 2003/0234512 A1 | 12/2003 | Holub |
| 2004/0119822 A1 | 6/2004 | Custer et al. |
| 2004/0130441 A1 * | 7/2004 | Lee .................... B60D 1/58 340/431 |
| 2004/0203660 A1 | 10/2004 | Tibrewal et al. |
| 2004/0207525 A1 | 10/2004 | Wholey et al. |
| 2004/0260438 A1 | 12/2004 | Chernetsky et al. |
| 2005/0000738 A1 * | 1/2005 | Gehring ................ B62D 13/06 180/14.1 |
| 2005/0073433 A1 | 4/2005 | Gunderson et al. |
| 2005/0074143 A1 | 4/2005 | Kawai |
| 2005/0091408 A1 | 4/2005 | Parupudi et al. |
| 2005/0128059 A1 | 6/2005 | Vause |
| 2005/0146607 A1 | 7/2005 | Linn et al. |
| 2005/0168331 A1 | 8/2005 | Gunderson |
| 2005/0177635 A1 | 8/2005 | Schmidt et al. |
| 2005/0206225 A1 | 9/2005 | Offerle et al. |
| 2005/0206231 A1 | 9/2005 | Lu et al. |
| 2005/0206299 A1 | 9/2005 | Nakamura et al. |
| 2005/0236201 A1 | 10/2005 | Spannheimer et al. |
| 2005/0236896 A1 | 10/2005 | Offerle et al. |
| 2006/0071447 A1 | 4/2006 | Gehring et al. |
| 2006/0076828 A1 | 4/2006 | Lu et al. |
| 2006/0092129 A1 | 5/2006 | Choquet et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0156315 A1 | 7/2006 | Wood et al. |
| 2006/0190097 A1 | 8/2006 | Rubenstein |
| 2006/0190147 A1 | 8/2006 | Lee et al. |
| 2006/0238538 A1 | 10/2006 | Kapler et al. |
| 2006/0244579 A1 | 11/2006 | Raab |
| 2006/0250501 A1 | 11/2006 | Widmann et al. |
| 2006/0276959 A1 | 12/2006 | Matsuoka et al. |
| 2006/0287821 A1 | 12/2006 | Lin |
| 2006/0293800 A1 | 12/2006 | Bauer et al. |
| 2007/0027581 A1 * | 2/2007 | Bauer ................... B60T 8/1708 701/1 |
| 2007/0057816 A1 | 3/2007 | Sakakibara et al. |
| 2007/0132560 A1 | 6/2007 | Nystrom et al. |
| 2007/0132573 A1 | 6/2007 | Quach et al. |
| 2007/0198190 A1 | 8/2007 | Bauer et al. |
| 2007/0216136 A1 | 9/2007 | Dietz |
| 2007/0260395 A1 | 11/2007 | Matsuoka et al. |
| 2008/0027599 A1 | 1/2008 | Logan et al. |
| 2008/0027635 A1 | 1/2008 | Tengler et al. |
| 2008/0148374 A1 | 6/2008 | Spaur et al. |
| 2008/0177443 A1 | 7/2008 | Lee et al. |
| 2008/0180526 A1 | 7/2008 | Trevino |
| 2008/0186384 A1 | 8/2008 | Ishii et al. |
| 2008/0231701 A1 * | 9/2008 | Greenwood ............. B60R 1/00 348/148 |
| 2008/0312792 A1 | 12/2008 | Dechamp |
| 2008/0313050 A1 | 12/2008 | Basir |
| 2009/0005932 A1 | 1/2009 | Lee et al. |
| 2009/0045924 A1 | 2/2009 | Roberts, Sr. et al. |
| 2009/0063053 A1 | 3/2009 | Basson et al. |
| 2009/0075624 A1 | 3/2009 | Cox et al. |
| 2009/0079828 A1 | 3/2009 | Lee et al. |
| 2009/0082935 A1 | 3/2009 | Leschuk et al. |
| 2009/0093928 A1 | 4/2009 | Getman et al. |
| 2009/0106036 A1 | 4/2009 | Tamura et al. |
| 2009/0117890 A1 | 5/2009 | Jacobsen et al. |
| 2009/0140064 A1 | 6/2009 | Schultz et al. |
| 2009/0198425 A1 * | 8/2009 | Englert .................. B60D 1/30 701/70 |
| 2009/0219147 A1 | 9/2009 | Bradley et al. |
| 2009/0253466 A1 | 10/2009 | Saito et al. |
| 2009/0271078 A1 | 10/2009 | Dickinson |
| 2009/0306854 A1 | 12/2009 | Dechamp |
| 2009/0318119 A1 | 12/2009 | Basir et al. |
| 2010/0049374 A1 * | 2/2010 | Ferrin .................. G05D 1/0227 701/1 |
| 2010/0060739 A1 | 3/2010 | Salazar |
| 2010/0063670 A1 | 3/2010 | Brzezinski et al. |
| 2010/0098853 A1 | 4/2010 | Hoffmann et al. |
| 2010/0114471 A1 | 5/2010 | Sugiyama et al. |
| 2010/0152989 A1 | 6/2010 | Smith et al. |
| 2010/0156671 A1 | 6/2010 | Lee et al. |
| 2010/0157061 A1 | 6/2010 | Katsman et al. |
| 2010/0171828 A1 | 7/2010 | Ishii |
| 2010/0174422 A1 | 7/2010 | Jacobsen et al. |
| 2010/0191421 A1 | 7/2010 | Nilsson |
| 2010/0198491 A1 | 8/2010 | Mays |
| 2010/0222964 A1 | 9/2010 | Dechamp |
| 2010/0234071 A1 | 9/2010 | Shabtay et al. |

(56) References Cited

U.S. PATENT DOCUMENTS

| | | |
|---|---|---|
| 2010/0305815 A1 | 12/2010 | Trueman et al. |
| 2010/0306309 A1 | 12/2010 | Santori et al. |
| 2010/0324770 A1 | 12/2010 | Ramsey et al. |
| 2011/0022282 A1 | 1/2011 | Wu et al. |
| 2011/0025482 A1 | 2/2011 | Alguera et al. |
| 2011/0063425 A1 | 3/2011 | Tieman |
| 2011/0088659 A1 | 4/2011 | Wang et al. |
| 2011/0102583 A1 | 5/2011 | Kinzalow |
| 2011/0110530 A1 | 5/2011 | Kimura |
| 2011/0112721 A1 | 5/2011 | Wang et al. |
| 2011/0112762 A1 | 5/2011 | Gruijters et al. |
| 2011/0125457 A1 | 5/2011 | Lee et al. |
| 2011/0129093 A1 | 6/2011 | Karam et al. |
| 2011/0140872 A1 | 6/2011 | McClure |
| 2011/0149077 A1 | 6/2011 | Robert |
| 2011/0153198 A1 | 6/2011 | Kokkas et al. |
| 2011/0160956 A1 | 6/2011 | Chung et al. |
| 2011/0181457 A1 | 7/2011 | Basten |
| 2011/0185390 A1 | 7/2011 | Faenger et al. |
| 2011/0195659 A1 | 8/2011 | Boll et al. |
| 2011/0216199 A1 | 9/2011 | Trevino et al. |
| 2011/0257860 A1 | 10/2011 | Getman et al. |
| 2011/0281522 A1 | 11/2011 | Suda |
| 2011/0296037 A1 | 12/2011 | Westra et al. |
| 2012/0004805 A1 | 1/2012 | Gray et al. |
| 2012/0062743 A1 | 3/2012 | Lynam et al. |
| 2012/0062744 A1 | 3/2012 | Schofield et al. |
| 2012/0065815 A1 | 3/2012 | Hess |
| 2012/0079002 A1 | 3/2012 | Boll et al. |
| 2012/0084292 A1 | 4/2012 | Liang et al. |
| 2012/0086808 A1 | 4/2012 | Lynam et al. |
| 2012/0095649 A1 | 4/2012 | Klier et al. |
| 2012/0185131 A1* | 7/2012 | Headley .............. B60D 1/245 701/41 |
| 2012/0191285 A1 | 7/2012 | Woolf et al. |
| 2012/0200706 A1 | 8/2012 | Greenwood et al. |
| 2012/0224059 A1 | 9/2012 | Takamatsu |
| 2012/0265416 A1 | 10/2012 | Lu et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0288156 A1 | 11/2012 | Kido |
| 2012/0290150 A1 | 11/2012 | Doughty et al. |
| 2012/0314073 A1 | 12/2012 | Shimoda et al. |
| 2012/0316732 A1 | 12/2012 | Auer |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0038436 A1 | 2/2013 | Brey et al. |
| 2013/0041524 A1 | 2/2013 | Brey |
| 2013/0057397 A1 | 3/2013 | Cutler et al. |
| 2013/0076007 A1 | 3/2013 | Goode et al. |
| 2013/0120161 A1 | 5/2013 | Wakabayashi et al. |
| 2013/0148748 A1 | 6/2013 | Suda |
| 2013/0158803 A1 | 6/2013 | Headley |
| 2013/0158863 A1 | 6/2013 | Skvarce et al. |
| 2013/0226390 A1 | 8/2013 | Luo et al. |
| 2013/0250114 A1 | 9/2013 | Lu |
| 2013/0253814 A1 | 9/2013 | Wirthlin |
| 2013/0268160 A1 | 10/2013 | Trombley et al. |
| 2014/0005918 A1 | 1/2014 | Qiang |
| 2014/0012465 A1 | 1/2014 | Shank et al. |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0074743 A1 | 3/2014 | Rademaker |
| 2014/0085472 A1 | 3/2014 | Lu et al. |
| 2014/0088797 A1 | 3/2014 | McClain et al. |
| 2014/0088824 A1 | 3/2014 | Ishimoto |
| 2014/0121883 A1 | 5/2014 | Shen et al. |
| 2014/0121930 A1 | 5/2014 | Allexi et al. |
| 2014/0125795 A1 | 5/2014 | Yerke |
| 2014/0156148 A1 | 6/2014 | Kikuchi |
| 2014/0160276 A1 | 6/2014 | Pliefke et al. |
| 2014/0172232 A1* | 6/2014 | Rupp .............. B60W 30/18036 701/36 |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0267727 A1 | 9/2014 | Alaniz |
| 2014/0277941 A1 | 9/2014 | Chiu et al. |
| 2014/0277942 A1* | 9/2014 | Kyrtsos .............. G01B 21/02 701/41 |
| 2014/0297128 A1* | 10/2014 | Lavoie .............. G01B 21/06 701/41 |
| 2014/0297129 A1* | 10/2014 | Lavoie .............. B62D 13/06 701/41 |
| 2014/0303847 A1 | 10/2014 | Lavoie |
| 2014/0303849 A1* | 10/2014 | Hafner .............. B62D 13/06 701/42 |
| 2014/0309888 A1 | 10/2014 | Smit et al. |
| 2014/0324295 A1 | 10/2014 | Lavoie et al. |
| 2014/0343795 A1 | 11/2014 | Lavoie |
| 2014/0358429 A1 | 12/2014 | Shutko et al. |
| 2014/0361955 A1 | 12/2014 | Goncalves |
| 2014/0379217 A1 | 12/2014 | Rupp et al. |
| 2015/0002670 A1 | 1/2015 | Bajpai |
| 2015/0057903 A1 | 2/2015 | Rhode et al. |
| 2015/0066296 A1 | 3/2015 | Trombley et al. |
| 2015/0094945 A1 | 4/2015 | Cheng et al. |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0142211 A1 | 5/2015 | Shehata et al. |
| 2015/0149040 A1* | 5/2015 | Hueger .............. B62D 13/06 701/41 |
| 2015/0158527 A1 | 6/2015 | Hafner et al. |
| 2015/0165850 A1* | 6/2015 | Chiu .............. B60D 1/62 701/41 |
| 2015/0179075 A1 | 6/2015 | Lee |
| 2015/0197278 A1 | 7/2015 | Boos et al. |
| 2015/0203156 A1 | 7/2015 | Hafner et al. |
| 2015/0210317 A1 | 7/2015 | Hafner et al. |
| 2015/0217692 A1 | 8/2015 | Yanagawa |
| 2015/0217693 A1 | 8/2015 | Pliefke et al. |
| 2015/0232031 A1 | 8/2015 | Kitaura et al. |
| 2015/0232092 A1 | 8/2015 | Fairgrieve et al. |
| 2015/0234386 A1 | 8/2015 | Zini et al. |
| 2015/0344028 A1 | 12/2015 | Gieseke et al. |
| 2016/0001705 A1 | 1/2016 | Greenwood et al. |
| 2016/0039456 A1 | 2/2016 | Lavoie et al. |
| 2016/0059780 A1 | 3/2016 | Lavoie |
| 2016/0059888 A1 | 3/2016 | Bradley et al. |
| 2016/0059889 A1* | 3/2016 | Herzog .............. B62D 13/06 701/41 |
| 2016/0096549 A1 | 4/2016 | Herzog et al. |
| 2016/0129939 A1 | 5/2016 | Singh et al. |
| 2016/0152263 A1 | 6/2016 | Singh et al. |
| 2016/0280267 A1 | 9/2016 | Lavoie et al. |
| 2016/0304122 A1 | 10/2016 | Herzog et al. |
| 2017/0008560 A1* | 1/2017 | Kyrtsos .............. B62D 13/06 |
| 2017/0073003 A1* | 3/2017 | Shepard .............. B62D 13/06 |
| 2017/0073005 A1* | 3/2017 | Ghneim .............. B62D 13/06 |
| 2017/0080974 A1* | 3/2017 | Lavoie .............. B60K 37/02 |
| 2017/0106796 A1* | 4/2017 | Lavoie .............. B60R 1/00 |
| 2017/0129298 A1* | 5/2017 | Lu .............. B60G 17/015 |
| 2017/0129403 A1* | 5/2017 | Lavoie .............. B60R 1/00 |
| 2017/0158234 A1* | 6/2017 | Herzog .............. B62D 13/06 |

(56) References Cited

U.S. PATENT DOCUMENTS

| | | | |
|---|---|---|---|
| 2017/0174022 A1* | 6/2017 | Hu | G06T 7/74 |
| 2017/0174130 A1* | 6/2017 | Hu | B60R 1/00 |
| 2017/0185852 A1* | 6/2017 | Pliefke | G06K 9/00805 |
| 2017/0259850 A1 | 9/2017 | Yamashita et al. | |
| 2017/0297619 A1* | 10/2017 | Lavoie | B62D 6/002 |
| 2017/0297620 A1* | 10/2017 | Lavoie | B62D 13/06 |
| 2017/0313351 A1* | 11/2017 | Lavoie | B62D 13/06 |
| 2018/0001928 A1* | 1/2018 | Lavoie | B62D 13/06 |
| 2018/0043933 A1* | 2/2018 | Hu | B62D 13/06 |

FOREIGN PATENT DOCUMENTS

| | | |
|---|---|---|
| CN | 202541524 U | 11/2012 |
| DE | 3931518 A1 | 4/1991 |
| DE | 9208595 U1 | 8/1992 |
| DE | 10065230 A1 | 7/2002 |
| DE | 10154612 A1 | 5/2003 |
| DE | 102005043466 A1 | 3/2007 |
| DE | 102005043467 A1 | 3/2007 |
| DE | 102005043468 A1 | 3/2007 |
| DE | 102006035021 | 1/2008 |
| DE | 102006048947 A1 | 4/2008 |
| DE | 102008020838 A1 | 11/2008 |
| DE | 102009012253 A1 | 9/2010 |
| DE | 102010004920 A1 | 7/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102011108440 A1 | 1/2013 |
| EP | 0418653 A1 | 3/1991 |
| EP | 0849144 A2 | 6/1998 |
| EP | 1361543 A2 | 11/2003 |
| EP | 1695888 A2 | 8/2006 |
| EP | 1593552 B1 | 3/2007 |
| EP | 2168815 A1 | 3/2010 |
| EP | 2199188 A2 | 6/2010 |
| EP | 2452549 A1 | 5/2012 |
| EP | 2551132 A1 | 1/2013 |
| EP | 2644477 A1 | 10/2013 |
| EP | 1569073 B1 | 9/2014 |
| EP | 2803944 A2 | 11/2014 |
| FR | 2515379 A1 | 10/1981 |
| FR | 2606717 A1 | 5/1988 |
| FR | 2716145 A1 | 8/1995 |
| FR | 2786456 A1 | 6/2000 |
| FR | 2980750 A1 | 4/2013 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 63-085568 | 6/1988 |
| JP | 06-028598 A | 4/1994 |
| JP | 2003148938 A | 5/2003 |
| JP | 2003175852 A | 6/2003 |
| JP | 2004114879 A | 4/2004 |
| JP | 3716722 B2 | 11/2005 |
| JP | 2008027138 A | 2/2008 |
| JP | 2008123028 A | 5/2008 |
| JP | 2009171122 A | 7/2009 |
| JP | 2012166647 A | 9/2012 |
| JP | 2014034289 A | 2/2014 |
| KR | 20060012710 A | 2/2006 |
| KR | 20060133750 A | 12/2006 |
| KR | 20110114897 A | 10/2011 |
| KR | 20140105199 A | 9/2014 |
| TW | 200930010 A | 7/2009 |
| WO | 8503263 A1 | 8/1985 |
| WO | 2011117372 A1 | 9/2011 |
| WO | 2014019730 A1 | 2/2014 |
| WO | 2014037500 A1 | 3/2014 |
| WO | 2014123575 A1 | 8/2014 |
| WO | 2015074027 A1 | 5/2015 |

OTHER PUBLICATIONS

M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

"Ford Super Duty: Truck Technology", Brochure, www.media.ford.com, Sep. 2011, pp. 1-2.

"Ford Guide to Towing", Trailer Life, Magazine, 2012, pp. 1-38.

"Dodge Dart: The Hot Compact Car", Brochure, www.dart-mouth.com/enginerring-development.html, pp. 1-6; date unknown.

M. Wagner, D. Zoebel, and A. Meroth, "Adaptive Software and Systems Architecture for Driver Assistance Systems" International Journal of Machine Learning and Computing, Oct. 2011, vol. 1, No. 4, pp. 359-365.

Christian Lundquist, Wolfgang Reinelt, Olof Enqvist, "Back Driving Assistant for Passenger Cars with Trailer", SAE Int'l, ZF Lenksysteme Gmbh, Schwaebisch Gmuend, Germany, 2006, pp. 1-8.

"Understanding Tractor-Trailer Performance", Caterpillar, 2006, pp. 1-28.

Divelbiss, A.W.; Wen, J.T.; "Trajectory Tracking Control of a Car-Trailer System", IEEE, Control Systems Technology, Aug. 6, 2002, vol. 5, No. 3, ISSN: 1063-6536, pp. 269-278.

Stahn, R.; Heiserich, G.; Stopp, A., "Laser Scanner-Based Navigation for Commercial Vehicles", IEEE, Intelligent Vehicles Symposium, Jun. 2007, pp. 969-974, print ISBN: 1931-0587.

Widrow, B.; Lamego, M.M., "Neurointerfaces: Applications", IEEE, Adaptive Systems for Signal Processing, Communications, and Control Symposium, Oct. 2000, pp. 441-444.

Dieter Zoebel, David Polock, Philipp Wojke, "Steering Assistance for Backing Up Articulated Vehicles", Systemics, Cybernetics and Informatics, Universitaet Koblenz-Landau, Germany, vol. 1, No. 5, pp. 101-106; date unknown.

Stephen K. Young, Carol A. Eberhard, Philip J. Moffa, "Development of Performance Specifications for Collision Avoidance Systems for Lane Change, Merging and Backing", TRW Space and Electronics Group, Feb. 1995, pp. 1-31.

Ford Motor Company, "09 F-150", Brochure, www.fordvehicles.com, pp. 1-30; date unknown.

Michael Paine, "Heavy Vehicle Object Detection Systems", Vehicle Design and Research Pty Lmited for VicRoads, Jun. 2003, pp. 1-22.

Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.

"2012 Edge—Trailer Towing Selector", Brochure, Preliminary 2012 RV & Trailer Towing Guide Information, pp. 1-3.

"Meritor Wabco Reverse Detection Module for Trailers with 12-Volt Constant Power Systems", Technical Bulletin, TP-02172, Revised Oct. 2004, pp. 1-8.

Simonoff, Adam J., "USH0001469 Remotely Piloted Vehicle Control and Interface System", Aug. 1, 1995, pp. 1-7.

"Range Rover Evoque's Surround Camera System"; MSN Douglas Newcomb Jun. 15, 2012, pp. 1-2.

"Electronic Trailer Steering", VSE, Advanced Steering & Suspension Solutions, Brochure, 2009, The Netherlands, pp. 1-28.

"WABCO Electronic Braking System—New Generation", Vehicle Control Systems—An American Standard Company, www.wabco-auto.com, 2004, pp. 1-8.

T. Wang, "Reverse-A-Matic-Wheel Direction Sensor System Operation and Installation Manual", Dec. 15, 2005, pp. 1-9.

"Wireless-Enabled Microphone, Speaker and User Interface for a Vehicle", The IP.com, Aug. 26, 2004, pp. 1-5, IP.com disclosure No. IPCOM000030782D.

"RFID Read/Write Module", Grand Idea Studio, 2013, pp. 1-3, website, http://www.grandideastudio.com/portfolio/rfid-read-write-module/.

Laszlo Palkovics, Pal Michelberger, Jozsef Bokor, Peter Gaspar, "Adaptive Identification for Heavy-Truck Stability Control", Vehicle Systems Dynamics Supplement, vol. 25, No. sup1, 1996, pp. 502-518.

(56) References Cited

OTHER PUBLICATIONS

"Convenience and Loadspace Features" Jaguar Land Rover Limited, 2012, pp. 1-15, http://www.landrover.com/us/en/lr/all-new-range-rover/explore/.
"Delphi Lane Departure Warning", Delphi Corporation, Troy, Michigan pp. 1-2; date unknown.
Micah Steele, R. Brent Gillespie, "Shared Control Between Human and Machine: Using a Haptic Steering Wheel to Aid in Land Vehicle Guidance", University of Michigan, pp. 1-5; date unknown.
"Electric Power Steering", Toyota Hybrid System Diagnosis-Course 072, Section 7, pp. 1-10; date unknown.
"Telematics Past, Present, and Future," Automotive Service Association, www.ASAshop.org, May 2008, 20 pgs.
"Fully Automatic Trailer Tow Hitch With LIN Bus," https://webista.bmw.com/webista/show?id=1860575499&lang=engb&print=1, pp. 1-5; date unknown.
Nüsser, René; Pelz, Rodolfo Mann, "Bluetooth-based Wireless Connectivity in an Automotive Environment", VTC, 2000, pp. 1935-1942.
Whitfield, Kermit, "A Hitchhiker's Guide to the Telematics Ecosystem", Automotive Design & Production, Oct. 1, 2003, 3 pgs.
Narasimhan, N.; Janssen, C.; Pearce, M.; Song, Y., "A Lightweight Remote Display Management Protocol for Mobile Devices", 2007, IEEE, pp. 711-715.
Microsoft, Navigation System, Sync Powered by Microsoft, Ford Motor Company, Jul. 2007, 164 pgs.
Microsoft, Supplemental Guide, Sync Powered by Microsoft, Ford Motor Company, Nov. 2007, 86 pgs.
Voelcker, J., "Top 10 Tech Cars: Its the Environment, Stupid", IEEE Spectrum, Apr. 2008, pp. 26-35.
Microsoft, Navigation System, Sync Powered by Microsoft, Ford Motor Company, Oct. 2008, 194 pgs.
Microsoft, Supplemental Guide, Sync Powered by Microsoft, Ford Motor Company, Oct. 2008, 83 pgs.
Chantry, Darryl, "Mapping Applications to the Cloud", Microsoft Corporation, Jan. 2009, 20 pgs.
Yarden, Raam; Surage Jr., Chris; Kim, Chong IL; Doboli, Alex; Voisan, Emil; Purcaru, Constantin, "TUKI: A Voice-Activated Information Browser", 2009, IEEE, pp. 1-5.
Gil-Castiñeira, Felipe; Chaves-Diéguez, David; González-Castaño, Francisco J., "Integration of Nomadic Devices with Automotive User Interfaces", IEEE Transactions on Consumer Electronics, Feb. 2009, vol. 55, Issue 1, pp. 34-41.
Microsoft, Navigation System, Sync Powered by Microsoft, Ford Motor Company, Jul. 2009, 196 pgs.
Microsoft, Supplemental Guide, Sync Powered by Microsoft, Ford Motor Company, Aug. 2009, 87 pgs.
Goodwin, Antuan, "Ford Unveils Open-Source Sync Developer Platform", The Car Tech Blog, Oct. 29, 2009, 5 pgs. [Retrieved from http://reviews.cnet.com/8301-13746_7-10385619-48.html on Feb. 15, 2011].
Lamberti, Ralf, "Full Circle: The Rise of Vehicle-Installed Telematics",Telematics Munich, Nov. 10, 2009, 12 pgs.
"Apple Files Patent Which Could Allow You to Control Your Computer Remotely Using iPhone", Dec. 18, 2009, 7 pgs [Retrieved from www.iphonehacks.com on Jun. 22, 2010].
Newmark, Zack, "Student develop in-car cloud computing apps; envision the future of in-car connectivity", May 4, 2010, 3 pgs [Retrieved from www.worldcarfans.com on Jun. 18, 2010].
"Service Discovery Protocol (SDP)", Palo Wireless Bluetooth Resource Center, 7 pgs [Retrieved from http://palowireless.com/infotooth/tutorial/sdp.asp on Aug. 3, 2010].
Sonnenberg, Jan, "Service and User Interface Transfer from Nomadic Devices to Car Infotainment Systems", Second International Conference on Automotive User Interfaces and Interactive Vehicular Applications (Automotive UI), Nov. 11-12, 2010, pp. 162-165.
"MobileSafer makes it easy to keep connected and safe", ZoomSafer Inc., 2010, 5 pgs. [Retrieved from http://zoomsafer.com/products/mobilesafer on Dec. 28, 2010].
"PhonEnforcer FAQs", Turnoffthecellphone.com, 3 pgs. [Retrieved from http://turnoffthecellphone.com/faq.html on Dec. 28, 2010].
"How PhonEnforcer Works", Turnoffthecellphone.com, 2 pgs. [Retrieved from http://turnoffthecellphone.com/howitworks.htm on Dec. 28, 2010].
European Patent Office, European Search Report for Application No. EP11151623, Feb. 15, 2011, 7 pgs.
Wikipedia, "X Window System", Wikipedia, The Free Encyclopedia, date unknown, 19 pgs. [Retrieved from http://en.wikipedia.org/w/index.php?title=X_Window_System&oldid=639253038].

\* cited by examiner

TURN RECOVERY HUMAN MACHINE INTERFACE FOR TRAILER BACKUP ASSIST

FIELD OF THE INVENTION

The present invention generally relates to steering assist technologies in vehicles and, more particularly, to trailer backup assist system having a rotatable driver interface for controlling a radius of curvature for a trailer path.

BACKGROUND OF THE INVENTION

It is well known that backing up a vehicle with a trailer attached is a difficult task for many drivers. This is particularly true for drivers that are untrained at backing with trailers such as, for example, those that drive with an attached trailer on an infrequent basis (e.g., have rented a trailer, use a personal trailer on an infrequent basis, etc). One reason for such difficulty is that backing a vehicle with an attached trailer requires counter-steering that is opposite to normal steering when backing the vehicle without a trailer attached and/or requires braking to stabilize the vehicle-trailer combination before a jack-knife condition occurs. Another such reason for such difficulty is that small errors in steering while backing a vehicle with an attached trailer are amplified thereby causing the trailer to depart from a desired path.

To assist the driver in steering a vehicle with trailer attached, a trailer backup assist system needs to know the driver's intention. One common assumption with known trailer backup assist systems is that a driver of a vehicle with an attached trailer wants to back up straight and the system either implicitly or explicitly assumes a zero curvature path for the vehicle-trailer combination. Unfortunately most of real-world use cases of backing a trailer involve a curved path and, thus, assuming a path of zero curvature would significantly limit usefulness of the system. Some known systems assume that a path is known from a map or path planner, which can result in such systems having a fairly complex human machine interface (HMI) and vehicle/trailer position determination.

Therefore, an approach for backing a trailer that provides a simple human machine interface and that overcomes other shortcomings of known trailer backup assist systems would be advantageous, desirable and useful.

SUMMARY OF THE INVENTION

According to one aspect of the present disclosure, a backup assist system for a vehicle reversing a trailer includes an input receiving a backing command and outputting a control signal based thereon. A controller receives the control signal, generates a vehicle steering command based on the control signal, and determines a length of a recovery period based on the control signal. The system also includes an interface outputting an indication of the length of the recovery period.

According to another aspect of the present disclosure, a vehicle includes a steering system and an input receiving a backing command including both a direction and an amplitude. A controller determines a length of a recovery period based on the amplitude of the directional backing command. The controller also generates a steering command and outputs the steering command to the steering system. The vehicle further includes an interface outputting an indication of the length of the recovery period.

According to another aspect of the present disclosure, a method for assisting in reversing a vehicle-trailer combination includes receiving a control signal from an input corresponding to a directional backing command, generating a steering command based on the directional backing command, and outputting the steering command to a vehicle steering system. The method further includes determining a length of a recovery period based on the amplitude of the directional backing command and outputting an indication of the length of the recovery period via a vehicle interface.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
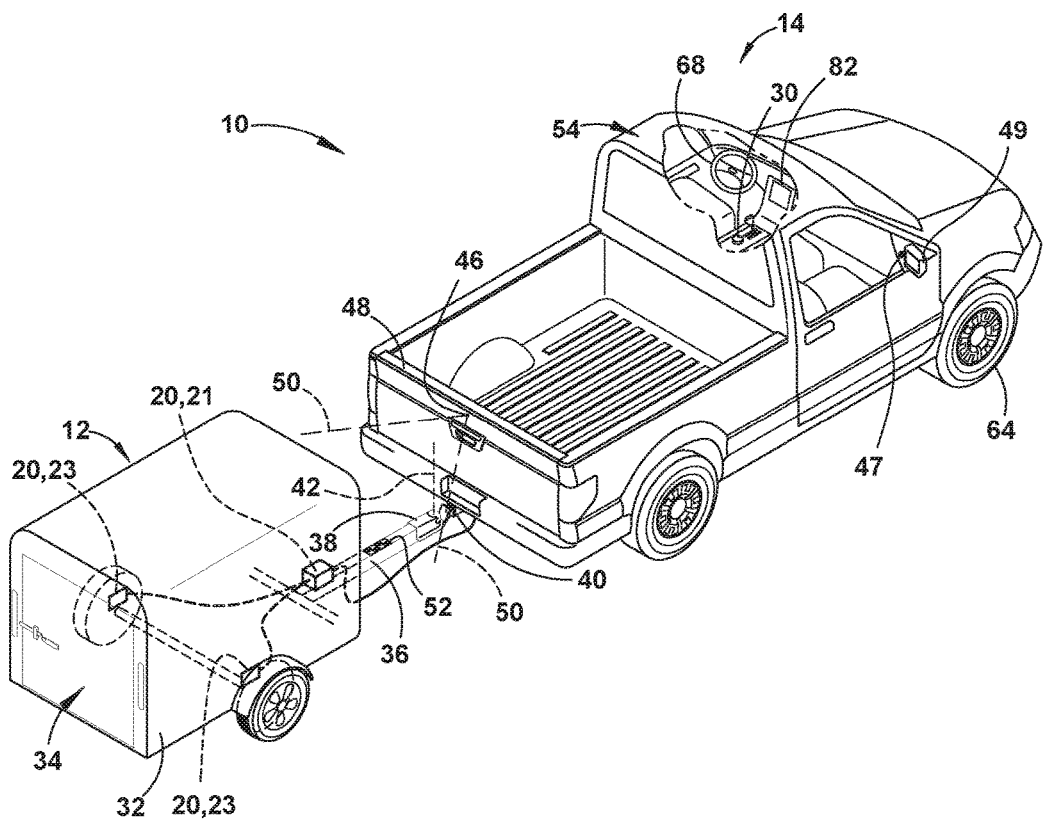
FIG. 1 is a top perspective view of a vehicle attached to a trailer with one embodiment of a hitch angle sensor for operating a trailer backup assist system.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1-12, reference numeral 10 generally designates a trailer backup assist system for controlling a backing path of a trailer 12 attached to a vehicle 14 by allowing a driver of the vehicle 14 to specify a desired curvature 26 of the backing path of the trailer 12. In one embodiment, the trailer backup assist system 10 automatically steers the vehicle 14 to guide the trailer 12 on the desired curvature or backing path 26 as a driver uses the accelerator and brake pedals to control the reversing speed of the vehicle 14. To monitor the position of the trailer 12 relative to the vehicle 14, the trailer backup assist system 10 may include a sensor system 16 that senses or otherwise determines a hitch angle γ between the trailer 12 and the vehicle 14. In one embodiment, the sensor system 16 may include a sensor module 20 attached to the trailer 12 that monitors the dynamics of the trailer 12, such as yaw rate, and communicates with a controller 28 of the trailer backup assist system 10 to determine the instantaneous hitch angle γ. Accordingly, one embodiment of a sensor module 20 is adapted to attach to the trailer 12 and generate a trailer yaw rate $\chi_2$. The trailer backup assist system 10 according to such an embodiment may also include a vehicle sensor system 16 that generates a vehicle yaw rate $\omega_1$ and a vehicle speed $v_1$. The controller 28 of the trailer backup assist system 10 may thereby estimates a hitch angle γ based on the trailer yaw rate $\chi_2$, the vehicle yaw rate $\omega_1$, and the vehicle speed $v_1$ in view of a kinematic relationship between the trailer 12 and the vehicle 14. In another embodiment, the sensor system 16 may include a hitch angle sensor 44, such as a vision-based system that employs a camera 46 on the vehicle 14 to monitor a target 52 on the trailer 12 to determine the hitch angle γ and thereby further increase reliability of the overall estimated hitch angle γ.

With respect to the general operation of the trailer backup assist system 10, a steering input device 18 may be provided, such as a rotatable knob 30, for a driver to provide the desired curvature 26 of the trailer 12. As such, the steering input device 18 may be operable between a plurality of selections, such as successive rotated positions of a knob 30, that each provide an incremental change to the desired curvature 26 of the trailer 12. Upon inputting the desired curvature 26, the controller may generate a steering command for the vehicle 14 to guide the trailer 12 on the desired curvature 26 based on the estimated hitch angle γ and a kinematic relationship between the trailer 12 and the vehicle 14. Therefore, the accuracy of the hitch angle estimation is critical to operating the trailer backup assist system 10. However, it is appreciated that such a system for instantaneously estimating hitch angle may be used in association with additional or alternative vehicle features, such as trailer sway monitoring.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

Still referring to FIG. 1, the sensor system 16 in the illustrated embodiment includes both a sensor module 20 and a vision-based hitch angle sensor 44 for estimating the hitch angle γ between the vehicle 14 and the trailer 12. The illustrated hitch angle sensor 44 employs a camera 46 (e.g. video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, energy transducers of a reverse aid system, a blind spot system, and/or a cross traffic alert system, and other conceivable sensors or indicators of the hitch angle γ to supplement or be used in place of the vision-based hitch angle sensor 44.

The embodiment of the sensor module 20 illustrated in FIG. 1 includes a housed sensor cluster 21 mounted on the tongue 36 of the trailer 12 proximate the enclosed cargo area 34 and includes left and right wheel speed sensors 23 on laterally opposing wheels of the trailer 12. It is conceivable that the wheel speed sensors 23 may be bi-directional wheel speed sensors for monitoring both forward and reverse speeds. Also, it is contemplated that the sensor cluster 21 in additional embodiments may be mounted on alternative portions of the trailer 12.

The sensor module 20 generates a plurality of signals indicative of various dynamics of the trailer 12. The signals may include a yaw rate signal, a lateral acceleration signal, and wheel speed signals generated respectively by a yaw rate sensor 25, an accelerometer 27, and the wheel speed sensors 23. Accordingly, in the illustrated embodiment, the yaw rate sensor 25 and the accelerometer 27 are contained within the housed sensor cluster 21, although other configurations are conceivable. It is conceivable that the accelerometer 27, in some embodiments, may be two or more separate sensors and may be arranged at an offset angle, such as two sensors arranged at plus and minus forty-five degrees from the longitudinal direction of the trailer or arranged parallel with the longitudinal and lateral directions of the trailer, to generate a more robust acceleration signal. It is also contemplated that these sensor signals could be compensated and filtered to remove offsets or drifts, and smooth out noise. Further, the controller 28 may utilizes processed signals received outside of the sensor system 16, including standard signals from the brake control system 72 and the power assist steering system 62, such as vehicle yaw rate $\omega_1$, vehicle speed $v_1$, and steering angle δ, to estimate the trailer hitch angle γ, trailer speed, and related trailer parameters. As described in more detail below, the controller 28 may estimate the hitch angle γ based on the trailer yaw rate $\omega_2$, the vehicle yaw rate $\omega_1$, and the vehicle speed $v_1$ in view of a kinematic relationship between the trailer 12 and the vehicle 14. The controller 28 of the trailer backup assist system 10 may also utilize the estimated trailer variables and trailer parameters to control the steering system 62, brake control system 72, and the powertrain control system 74, such as to assist backing the vehicle-trailer combination or to mitigate a trailer sway condition.

Figure 2:
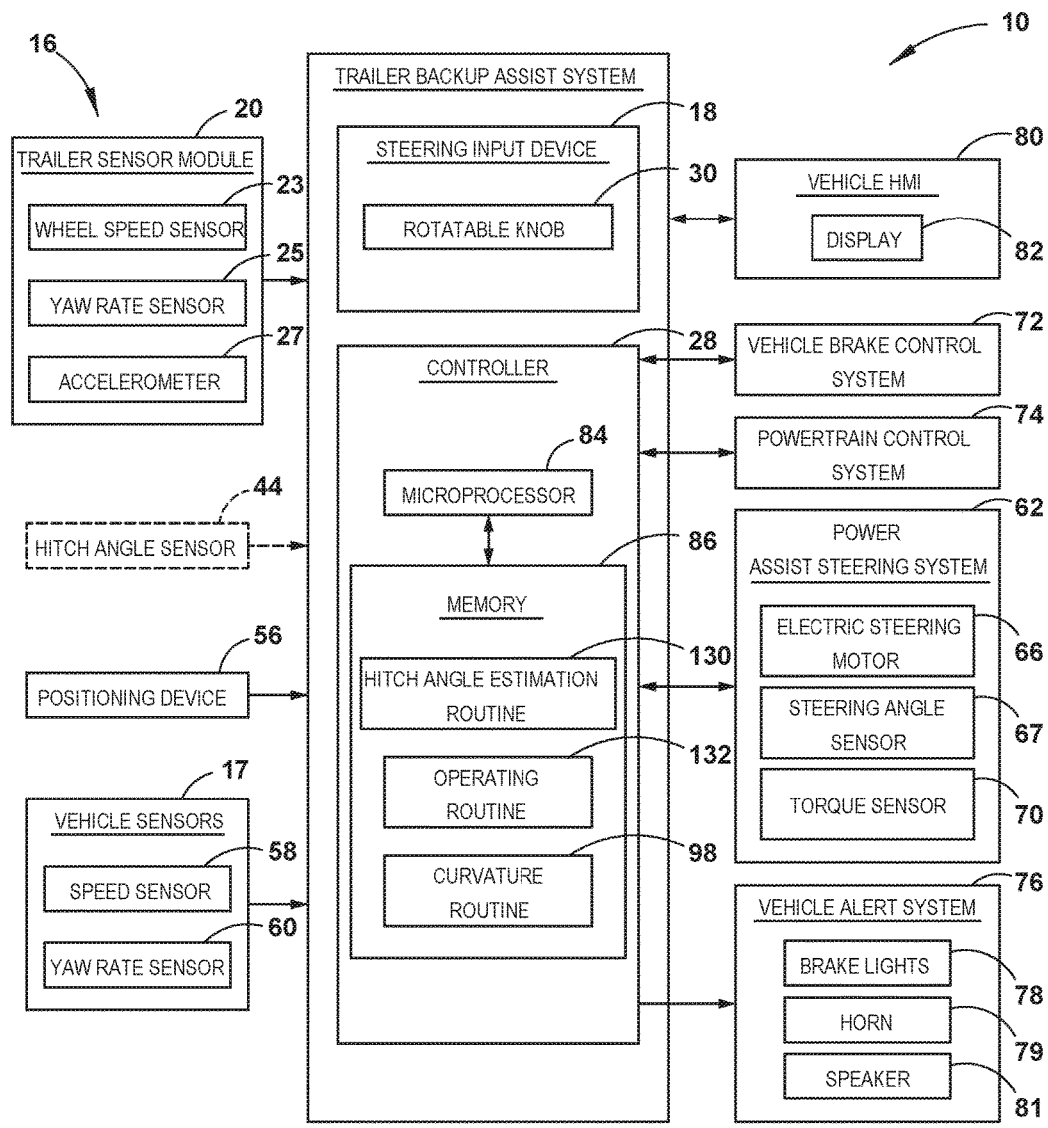
FIG. 2 is a block diagram illustrating one embodiment of the trailer backup assist system having a steering input device, a curvature controller, and a trailer braking system.

With reference to the embodiment of the trailer backup assist system 10 shown in FIG. 2, the hitch angle sensor 44 is provided in dashed lines to illustrate that in some embodiments it may be omitted when the trailer sensor module 20 is provided. The illustrated embodiment of the trailer backup assist system 10 receives vehicle and trailer status-related information from additional sensors and devices. This information includes positioning information from a positioning device 56, which may include a global positioning system (GPS) on the vehicle 14 or a handheld device, to determine a coordinate location of the vehicle 14 and the trailer 12 based on the location of the positioning device 56 with respect to the trailer 12 and/or the vehicle 14 and based on the estimated hitch angle γ. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a yaw rate sensor 60. It is contemplated that in additional embodiments, the hitch angle sensor 44 and other vehicle sensors and devices may provide sensor signals or other information, such as proximity sensor signals or successive images of the trailer 12, that the controller of the trailer backup assist system 10 may process with various routines to determine an indicator of the hitch angle γ, such as a range of hitch angles.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature 26 of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Referring again to the embodiment illustrated in FIG. 2, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle, in addition to other vehicle 14 and trailer 12 conditions to guide the trailer 12 along the desired curvature 26. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative or in addition to the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display screen 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display screen 82 for displaying one or more images and other information to a user. For instance, the portable device may display one or more images of the trailer 12 and an indication of the estimated hitch angle on the display screen 82. In addition, the portable device may provide feedback information, such as visual, audible, and tactile alerts.

As further illustrated in FIG. 2, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path of travel of the trailer 12 for the controller 28 to process and generate steering commands. More specifically, the steering input device 18 may provide a selection or positional information that correlates with a desired curvature 26 of the desired backing path of travel of the trailer 12. Also, the trailer steering commands provided by the steering input device 18 can include information relating to a commanded change in the path of travel, such as an incremental change in the desired curvature 26, and information relating to an indication that the trailer 12 is to travel along a path defined by a longitudinal centerline axis of the trailer 12, such as a desired curvature value of zero that defines a substantially straight path of travel for the trailer. As will be discussed below in more detail, the steering input device 18 according to one embodiment may include a movable control input device for allowing a driver of the vehicle 14 to command desired trailer steering actions or otherwise select and alter a desired curvature. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature 26 or other information defining a desired backing path, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, the trailer braking system, the powertrain control system 74, and other vehicle sensors and devices. The controller 28 may generate vehicle steering information and commands as a function of all or a portion of the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a hitch angle estimation routine 130, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 3:
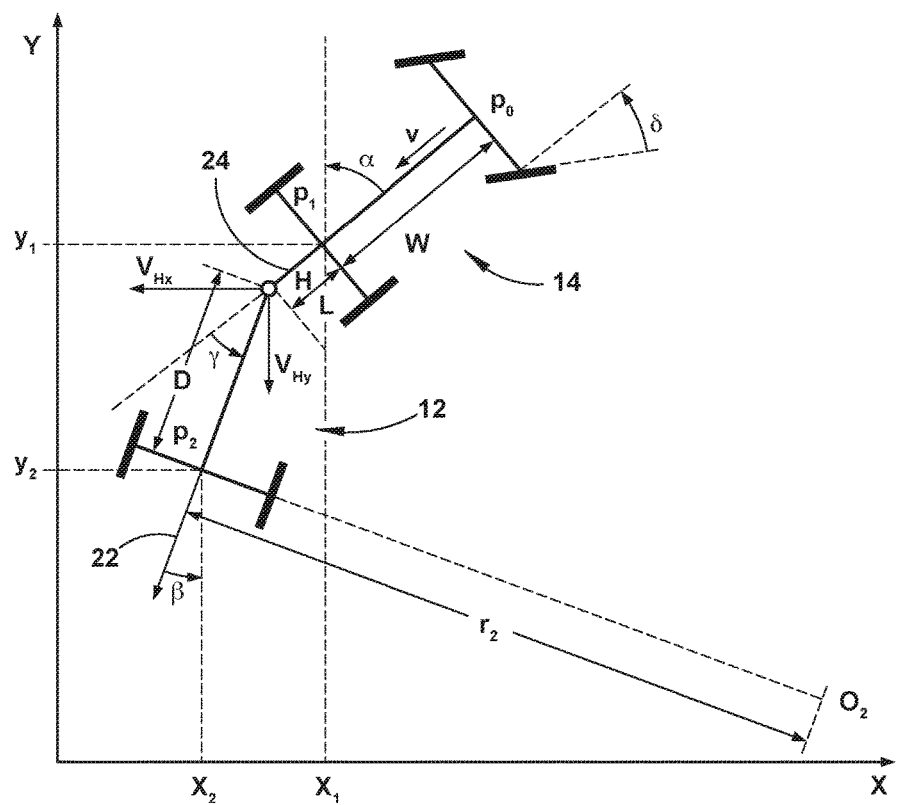
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

δ: steering angle at steered front wheels of the vehicle;
α: yaw angle of the vehicle;)
β: yaw angle of the trailer;
γ: hitch angle (γ=β−α);
W: wheel base of the vehicle;
L: drawbar length between hitch point and rear axle of the vehicle;
D: distance (trailer length) between hitch point and axle of the trailer or effective axle for a multiple axle trailer; and
$r_2$: curvature radius for the trailer.

One embodiment of a kinematic relationship between trailer path radius of curvature $r_2$ at the midpoint of an axle of the trailer 12, steering angle δ of the steered wheels 64 of the vehicle 14, and the hitch angle γ can be expressed in the equation provided below. As such, if the hitch angle γ is provided, the trailer path curvature $\kappa_2$ can be controlled based on regulating the steering angle δ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14.

In an additional embodiment, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 4:
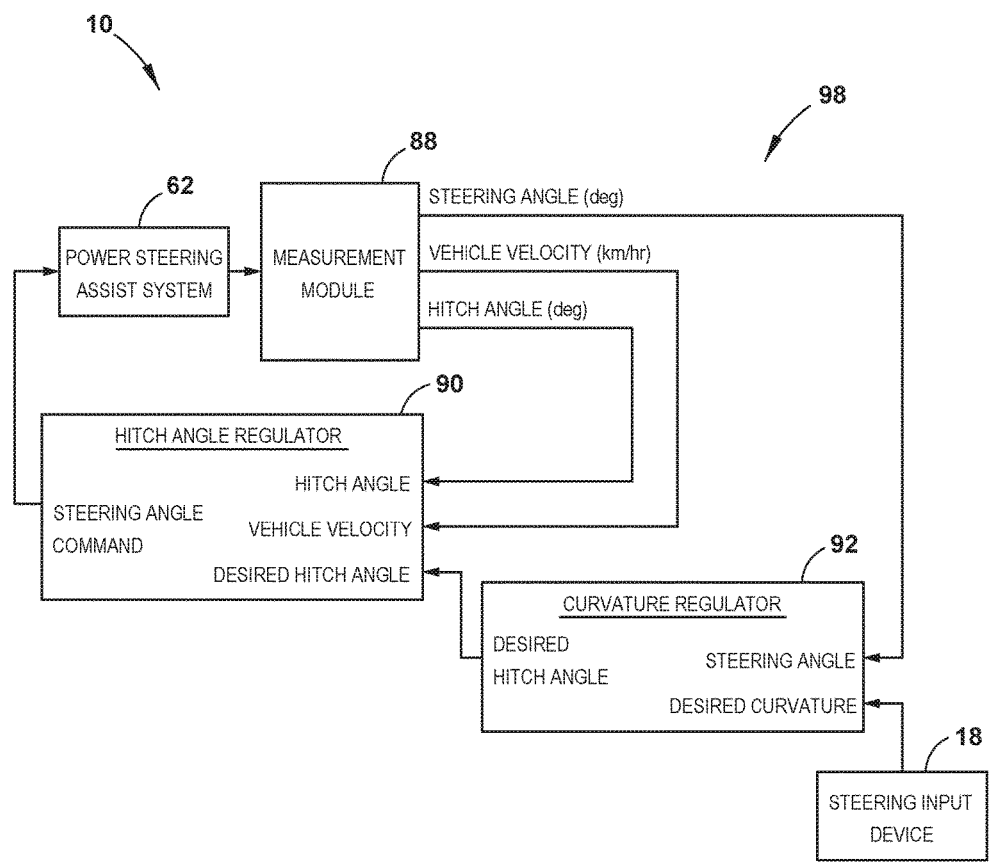
FIG. 4 is a schematic block diagram illustrating portions of a curvature controller, according to an additional embodiment, and other components of the trailer backup assist system, according to such an embodiment.

Yet another embodiment of the curvature routine 98 of the trailer backup assist system 10 is illustrated in FIG. 4, showing the general architectural layout whereby a measurement module 88, a hitch angle regulator 90, and a curvature regulator 92 are routines that may be stored in the memory 86 of the controller 28. In the illustrated layout, the steering input device 18 provides a desired curvature $\kappa_2$ value to the curvature regulator 92 of the controller 28, which may be determined from the desired backing path 26 that is input with the steering input device 18. The curvature regulator 92 computes a desired hitch angle γ(d) based on the current desired curvature $\kappa_2$ along with the steering angle δ provided by a measurement module 88 in this embodiment of the controller 28. The measurement module 88 may be a memory device separate from or integrated with the controller 28 that stores data from sensors of the trailer backup assist system 10, such as the hitch angle sensor 44, the vehicle speed sensor 58, the steering angle sensor 67, or alternatively the measurement module 88 may otherwise directly transmit data from the sensors without functioning as a memory device. Once the desired hitch angle γ(d) is computed by the curvature regulator 92 the hitch angle regulator 90 generates a steering angle command based on the computed desired hitch angle γ(d) as well as a measured or otherwise estimated hitch angle γ(m) and a current velocity of the vehicle 14. The steering angle command is supplied to the power assist steering system 62 of the vehicle 14, which is then fed back to the measurement module 88 to reassess the impacts of other vehicle characteristics impacted from the implementation of the steering angle command or other changes to the system. Accordingly, the curvature regulator 92 and the hitch angle regulator 90 continually process information from the measurement module 88 to provide accurate steering angle commands that place the trailer 12 on the desired curvature κ$_2$ and the desired backing path 26, without substantial overshoot or continuous oscillation of the path of travel about the desired curvature κ$_2$.

Specifically, entering the control system is an input, κ$_2$, which represents the desired curvature 26 of the trailer 12 that is provided to the curvature regulator 92. The curvature regulator 92 can be expressed as a static map, p(κ$_2$, δ), which in one embodiment is the following equation:

$$p(\kappa_2, \delta) = \tan^{-1}\left(\frac{\kappa_2 D + L\tan(\delta)}{\kappa_2 DL\tan(\delta) - W}\right)$$

Where,

κ$_2$ represents the desired curvature of the trailer 12 or 1/r$_2$ as shown in FIG. 3;

δ represents the steering angle;

L represents the distance from the rear axle of the vehicle 14 to the hitch pivot point;

D represents the distance from the hitch pivot point to the axle of the trailer 12; and W represents the distance from the rear axle to the front axle of the vehicle 14.

The output hitch angle of p(κ$_2$, δ) is provided as the reference signal, γ$_{ref}$, for the remainder of the control system, although the steering angle δ value used by the curvature regulator 92 is feedback from the non-linear function of the hitch angle regulator 90. It is shown that the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(u - \frac{v}{D}\sin(\gamma)\right)\right)$$

The feedback control law, g(u, γ, v), is implemented with a proportional integral (PI) controller, whereby the integral portion substantially eliminates steady-state tracking error. More specifically, the control system illustrated in FIG. 5 may be expressed as the following differential-algebraic equations:

$$\dot{y}(t) = \frac{v(t)}{D}\sin(\gamma(t)) + \left(1 + \frac{L}{D}\cos(\gamma(t))\right)\frac{v(t)}{W}\bar{\delta}$$

$$\tan(\delta) = \bar{\delta} = \frac{W}{v(t)\left(1 + \frac{L}{D}\cos(\gamma(t))\right)}\left(K_P(p(\kappa_2, \delta) - \gamma(t)) - \frac{v(t)}{D}\sin(\gamma(t))\right)$$

It is contemplated that the PI controller may have gain terms based on trailer length D since shorter trailers will generally have faster dynamics. In addition, the hitch angle regulator 90 may be configured to prevent the desired hitch angle γ(d) to reach or exceed a jackknife angle γ(j), as computed by the controller 28 or otherwise determined by the trailer backup assist system 10, as disclosed in greater detail herein.

Figure 5:
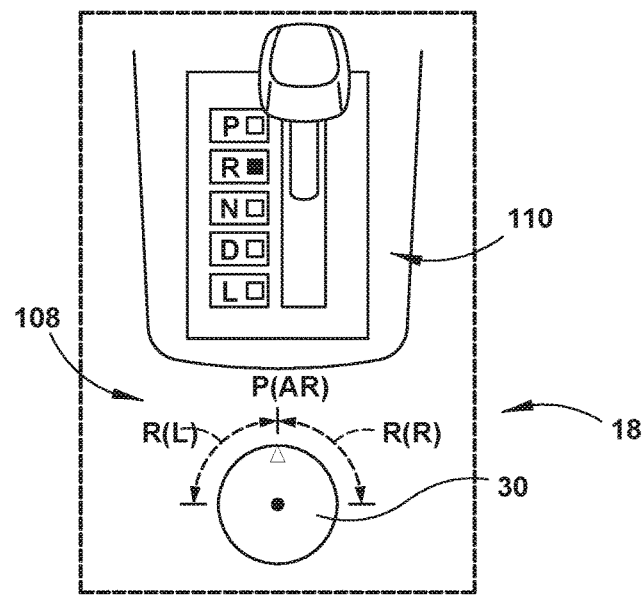
FIG. 5 is a plan view of a steering input device having a rotatable knob for operating the trailer backup assist system, according to one embodiment.

Referring now to FIG. 5, one embodiment of the steering input device 18 is illustrated disposed on a center console 108 of the vehicle 14 proximate a shifter 110. In this embodiment, the steering input device 18 includes a rotatable knob 30 for providing the controller 28 with the desired backing path of the trailer 12. More specifically, the angular position of the rotatable knob 30 may correlate with a desired curvature, such that rotation of the knob to a different angular position provides a different desired curvature with an incremental change based on the amount of rotation and, in some embodiments, a normalized rate, as described in greater detail herein.

Figure 6:
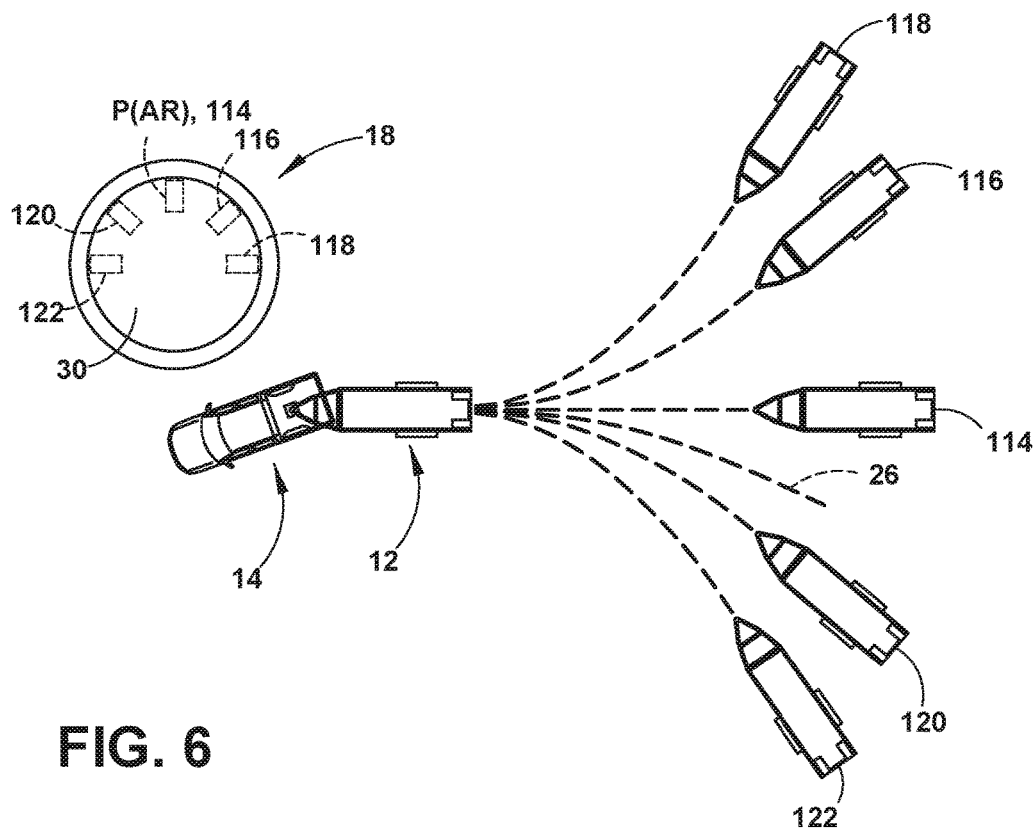
FIG. 6 is a plan view of another embodiment of a rotatable knob for selecting a desired curvature of a trailer and a corresponding schematic diagram illustrating a vehicle and a trailer with various trailer curvature paths correlating with desired curvatures that may be selected.

The rotatable knob 30, as illustrated in FIG. 6, may be biased (e.g., by a spring return) to a center, or at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). In this manner, the input device 18 can provide a signal to controller 28 that includes both a direction (corresponding to the range, R(L) or R(R), in which knob 30 is turned) and an amplitude according to how far within that range knob 30 is turned. Accordingly, controller 28 can interpret the signal from input device 18 as a curvature input in the direction indicated byt eh signal. To provide a tactile indication of an amount of rotation of the rotatable knob 30, a torque that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) and a direction of movement of the rotatable knob 30 with respect to the at-rest position P(AR), which itself may correspond to a zero-curvature command. It is also contemplated that the rate of rotation of the rotatable knob 30 may also be used to determine the desired curvature 26 output to the controller 28. The at-rest position P(AR) of the knob corresponds to a signal indicating that the vehicle 14 should be steered such that the trailer 12 is backed along a substantially straight backing path 114 (FIG. 6) zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 that is possible without the corresponding vehicle steering information causing a jackknife condition.

As shown in FIG. 6, a driver can turn the rotatable knob 30 to provide a desired curvature 26 while the driver of the vehicle 14 backs the trailer 12. In the illustrated embodiment, the rotatable knob 30 rotates about a central axis between a center or middle position 114 corresponding to a substantially straight backing path 26 of travel, as defined by the longitudinal direction 22 of the trailer 12, and various rotated positions 116, 118, 120, 122 on opposing sides of the middle position 114, commanding a desired curvature 26 corresponding to a radius of the desired backing path of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position.

Figure 7:
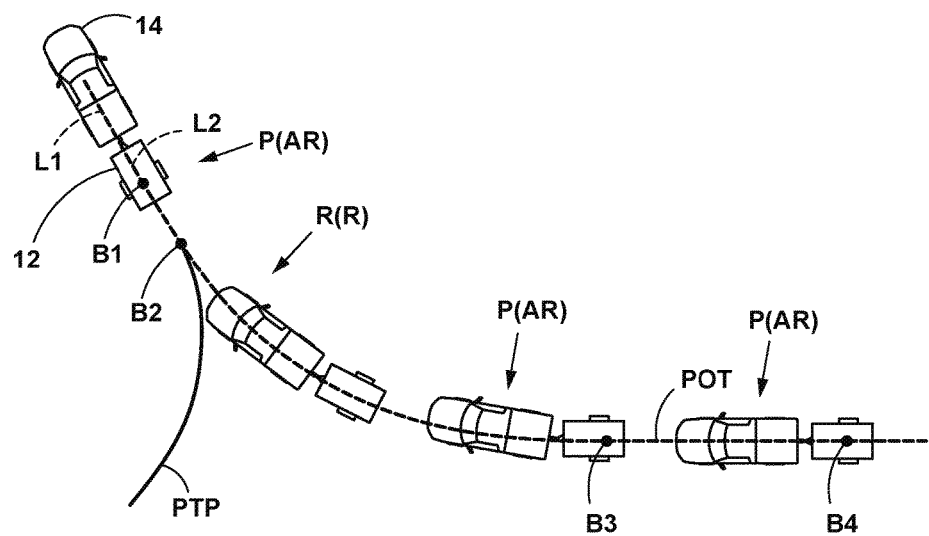
FIG. 7 is a schematic diagram showing a backup sequence of a vehicle and a trailer implementing various sequential curvature selections with the trailer backup assist system, according to one embodiment.

Referring to FIG. 7, an example of using the steering input device 18 for dictating a curvature of a desired backing path of travel (POT) of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 for causing the trailer 12 to be steered to the right as a function of an amount of rotation of the rotatable knob 30 with respect to the at-rest position P(AR), a rate movement of the knob, and/or a direction of movement of the knob 30 with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob 30 is in/returned to the at-rest position P(AR).

In the embodiment illustrated in FIG. 7, in order to activate the trailer backup assist system 10, the driver interacts with the trailer backup assist system 10 and the automatically steers as the driver reverses the vehicle 14. As discussed above, the driver may command the trailer backing path by using a steering input device 18 and the controller 28 may determine the vehicle steering angle to achieve the desired curvature 26, whereby the driver controls the throttle and brake while the trailer backup assist system 10 controls the steering.

Figure 8:
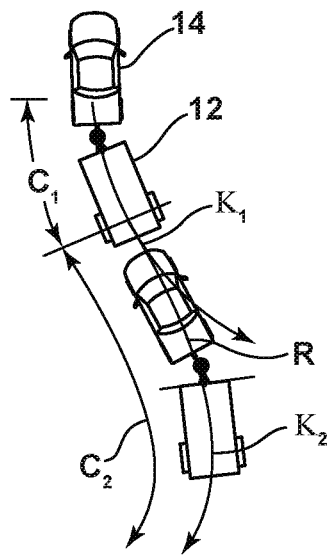
FIG. 8 is a schematic view showing a vehicle backing a trailer along a path including multiple curvatures with a recovery period therebetween.

Referring now to FIG. 8, a schematic view of a vehicle 14 reversing a trailer 12 is shown during a sequence of backing maneuvers implemented using a particular implementation of the steering input device 18, including a rotatable knob 30, as described above. In this sequence, it is shown that upon initially reversing under a particular curvature command $C_1$ that corresponds with a curvature $\kappa_1$ of the combined trailer 12 and vehicle 14 (as implemented by system 10 by controlling the steering angle δ of the wheels 64 of vehicle 14, as described above), the combined trailer 12 and vehicle 14 will go through a recovery path R of a certain distance after a second curvature command $C_2$ is entered by the driver using knob 30. As shown, even when the subsequent curvature command $C_2$ is in a direction opposite the initial command $C_1$, a portion of the recovery path R will continue in the direction of $C_1$ as the path R transitions from the initially-commanded curvature $\kappa_1$ to reach the second commanded curvature $\kappa_2$. Overall, the distance needed for the combined trailer 12 and vehicle 14 combination to achieve the second commanded curvature $\kappa_2$ represents a lag between the driver imputing the second curvature command $C_2$ and the corresponding curvature $\kappa_2$ being reached.

Figure 9:
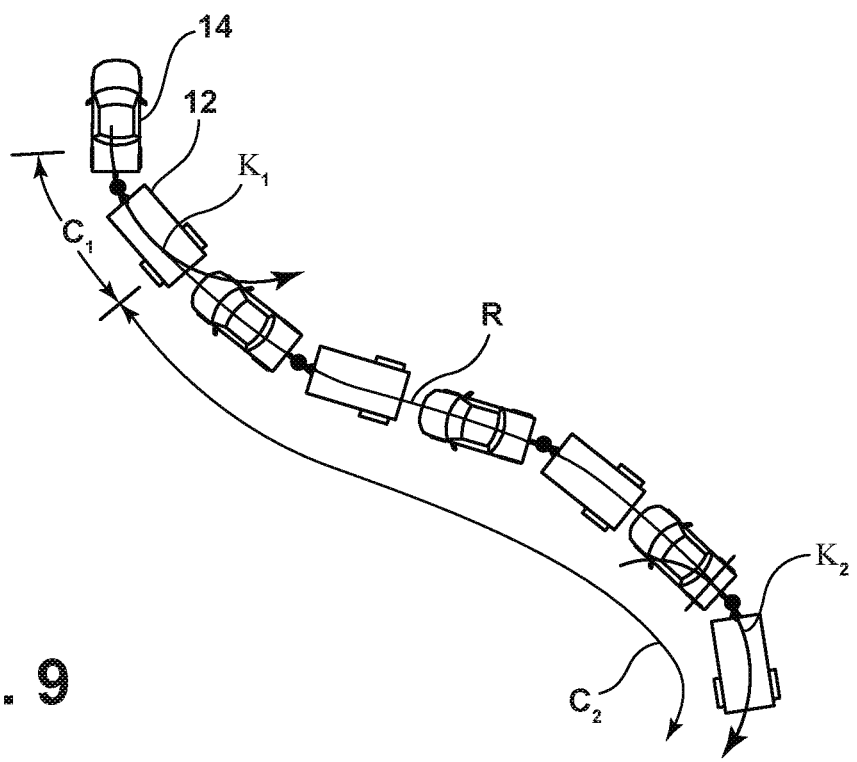
FIG. 9 is a further schematic view showing a vehicle backing a trailer along an alternative path including multiple curvatures with an extended recovery period therebetween.

As further shown in FIG. 9, when the initially-commanded curvature $\kappa_1$, corresponding to the initial curvature command $C_1$, is relatively tight (i.e. such that a high hitch angle γ is maintained), a relatively longer recovery path R is traversed after entering a second curvature command $C_2$ in a direction opposite the first curvature command $C_1$, a significant portion of which may be in the direction of the first curvature command $C_1$. This effect is generally even more pronounced as trailer length D increases, with relatively longer trailers traversing a relatively long recovery path R (such as at least three lengths of vehicle 14) even after a relatively looser (i.e. lower hitch angle γ) curvature. This can become a problem if the driver needs to change the direction of the trailer multiple times within a limited amount of lateral space relative to the vehicle staring point or commands an initial curvature $\kappa_1$ without enough overall room to recover without requiring that vehicle 14 be driven forward.

Figure 10:
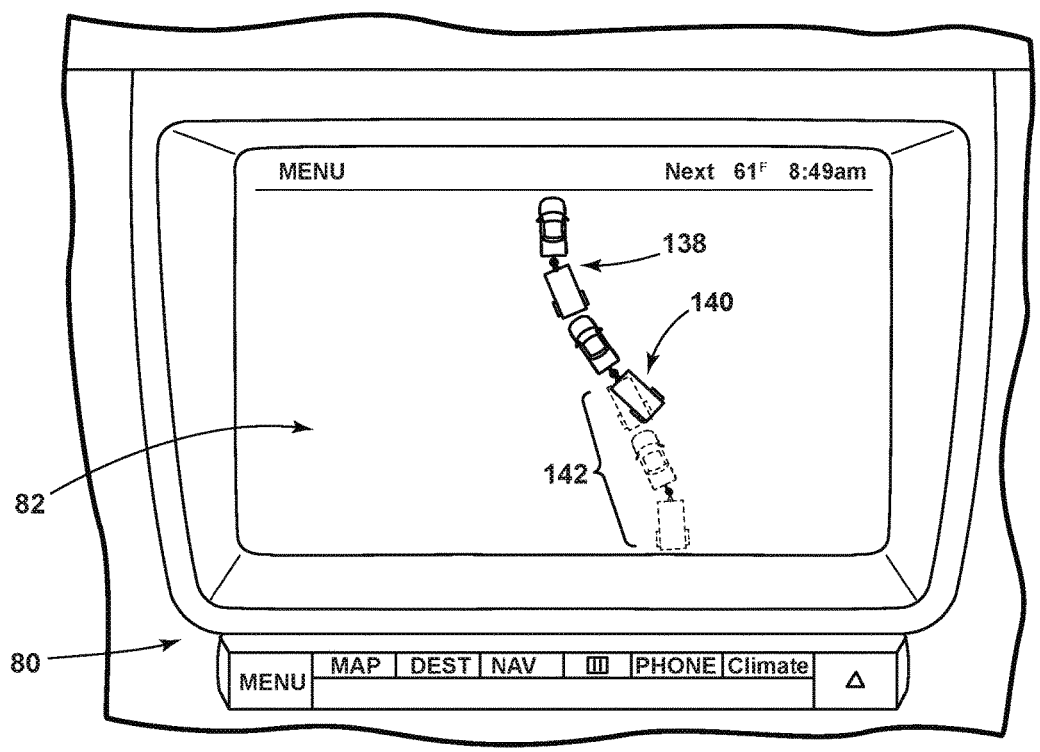
FIG. 10 is a detail view of a human-machine interface displaying information relating to backing and recovery paths of the vehicle backing the trailer using the trailer backup assist system of FIG. 1.
Figure 15:
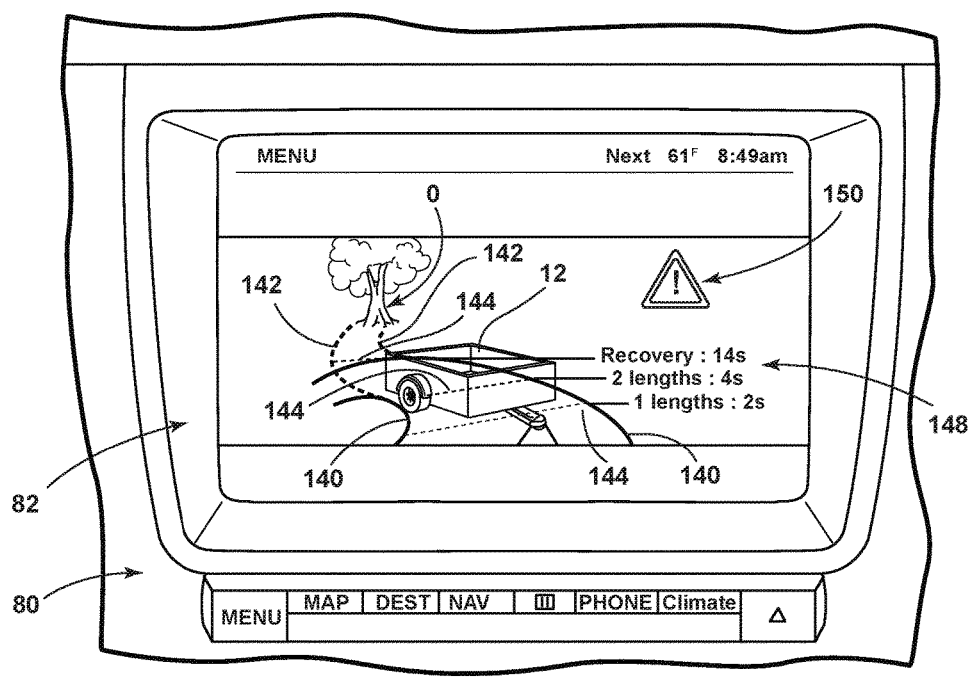
FIG. 15 is a top plan view of the human-machine interface of FIG. 14 showing information related to further backing and recovery paths.

To potentially help a driver avoid situations where there is inadequate room to recover from a commanded curvature, without restricting system 10 from allowing relatively tighter curvatures to be commanded, where adequate recovery space is needed, system 10 may utilize HMI 80 to indicate to a driver of vehicle 14 an approximate length (by distance, time, or both, for example) of the recovery path R of the vehicle 14 and trailer 12 combination. In various embodiments, the length of the recovery path R may be presented on HMI 80 graphically on display screen 82 in conjunction with an image 138 of vehicle 14 and trailer 12, as shown in one example in FIGS. 10 and 12. As illustrated in FIG. 10, system 10 may present on display screen 82 the image 138 of vehicle 14 and trailer 12 as a part of an overhead (or bird's eye) schematic view that also includes a depiction of the current backing path 140 corresponding to the curvature command C1 being input to system 10 by the user via rotatable knob 30 of input 18 (FIG. 15). A recovery path image 142 can further be overlayed over the vehicle image 138 in connection with the current backing path image 140. The recovery path image 142 can allow the user to visualize the distance or time needed to return to a straight backing path and/or to generally assess the space taken up by the current backing maneuver and a recovery therefrom.

Figure 12:
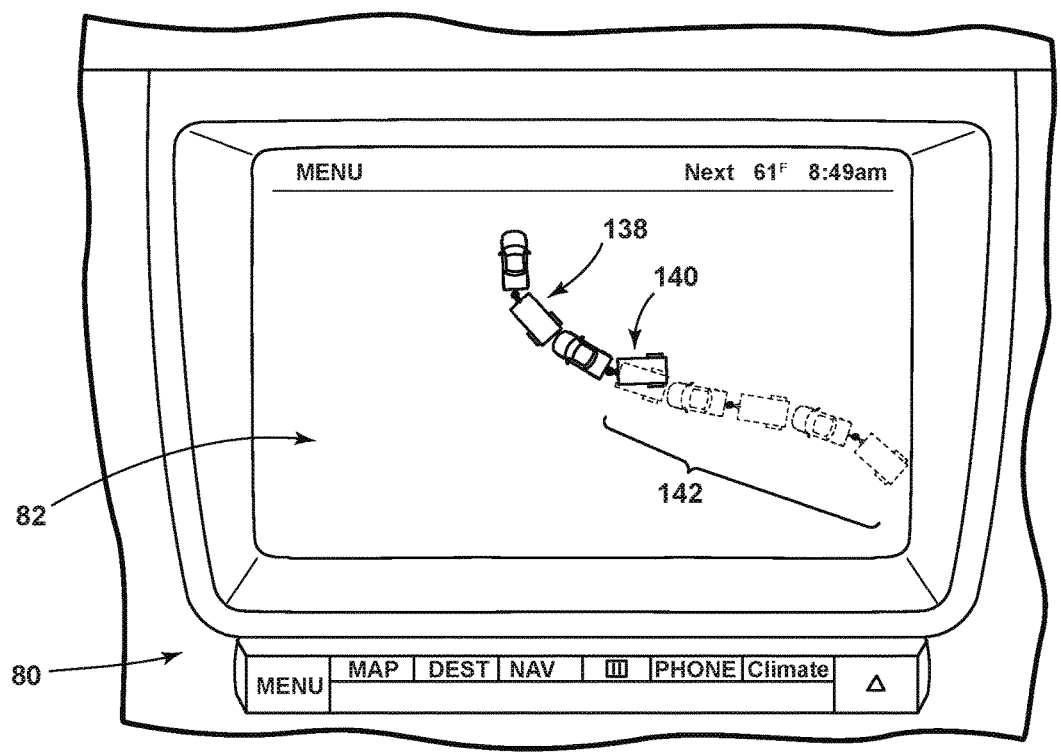
FIG. 12 is a top plan view of the human-machine interface of FIG. 10 showing information related to further backing and recovery paths.

In the illustrated embodiment of FIGS. 10 and 12, the backing path image 140 as well as the recovery path image 142 may consist of successive duplicate images of vehicle 14 and trailer 12 behind the vehicle image 138 itself. In further variations, both the backing path image 140 and the recovery path image 142 may be presented as lines or pairs of lines spaced to represent the width of vehicle 14 and/or trailer 12. Still further, in an additional example, the backing path 140 may be represented by the depicted duplicate images of vehicle 14 and trailer 12, while recovery path 142 is illustrated by lines or the like. Other variations and combinations are further possible to display the backing path 140 image and recovery path 142 image.

System 10 may calculate, using controller 28, for example, the geometry of backing path 140 and recovery path 142 dynamically during a reversing operation of the vehicle 14 and trailer 12 combination according to the kinematic model discussed above and used in implementing curvature routing 98, also discussed above. In particular, the backing path image 140 may be determined based on the curvature K1 corresponding to the particular curvature command C1 being entered via knob 30 (FIG. 11) during steady-state operation of system 10 (i.e. when the vehicle 14 and trailer 12 combination is being maintained along a consistent curvature) and may further include a portion reflecting a change from a previously commanded curvature to the currently commanded curvature, in the event of a change in the commanded curvature. In a similar manner, system 10 may calculate or estimate recovery path 142 using a parallel calculation involving a hypothetical transition or divergence from the current commanded curvature K1 to a theoretical subsequent curvature K2 that corresponds to a predetermined curvature in the opposite direction. Such a calculation can be made, for example, by controller 28 in a modified implementation of curvature algorithm in which the initial hitch angle input is the actual instantaneous hitch angle γ, with recursive calculations using the above-described kinematic model to determine successive steering angle inputs at predetermined intervals (such steering angles not actually being output to steering system 62) and resulting successive hitch angles to bring the combination of vehicle 14 and trailer 12 to the theoretical opposite curvature (input as K2). This determination can be carried out according to a simulation of the PI control system illustrated in FIG. 5, discussed further above.

Because the simulated calculations used to derive the predicted recovery path R are time-dependent, the recovery period can be expressed in time or can be converted to a distance using the instantaneous vehicle velocity. Further, the measured vehicle velocity can be used, in light of the above estimate, to plot the recovery path R spatially with respect to the current position of vehicle 14 and/or trailer 12, which is then output to display screen 82 according to one of the above-described schemes for graphical representation. The instance at which the curvature is deemed "recovered" can vary, but in particular embodiments can be either the point at which a zero curvature K or zero hitch angle γ, or the point at which the opposite curvature K2 is achieved. For purposes of the present discussion, recovery is deemed achieved at zero curvature (i.e. the point of inflection of the hitch angle γ at which the combination of vehicle 14 and trailer 12). In various embodiments, the above described calculation of the recovery path can be carried out for a predetermined time, a predetermined distance, until an interval is reached that can be presented as the graphical recover path 142 on display screen 82, or until recovery is achieved.

The particular degree of the opposite theoretical curvature input can vary. In various embodiments, a maximum controllable curvature can be input, such a curvature representing the maximum curvature realized at a steady-state hitch angle γ at the maximum controllable hitch angle γ(max), discussed above (or outside a predetermined safety angle thereof). In other embodiments, the opposite theoretical curvature input can be a curvature that is less than the maximum allowable curvature by an amount determined or estimated to itself result in a recovery period below a predetermined threshold. In particular, it may be desired to attempt to influence the behavior of the driver of vehicle 14 to maintain the curvature of the vehicle 14 and trailer 12 combination in a way that avoids lengthy recovery periods, such as to less than three lengths of vehicle 14, for example). Accordingly, system 10 can continue the above-described calculations for increasing or decreasing curvature values until a desired subsequent recovery period from the initial recovery period is realized. Alternatively, the value of the opposite theoretical curvature input can be limited to curvature value below the maximum value by an amount generally sufficient to maintain any subsequent recovery period below or reasonably within a desired limit. In one example, the theoretical opposing curvature can be 75% of the maximum curvature, although other values are possible.

Figure 13:
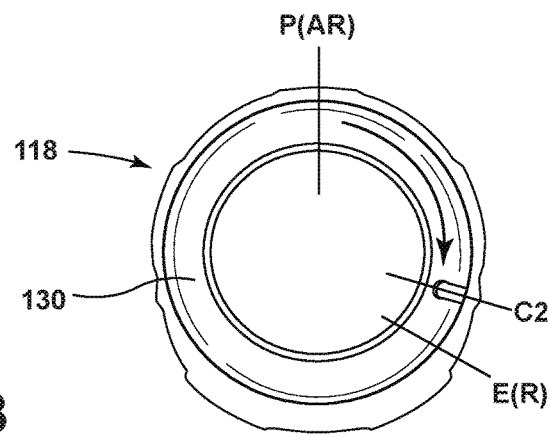
FIG. 13 is a top plan view of the steering input device including the rotatable knob of FIG. 11 commanding a curvature associated with the backing and recovery paths shown in FIG. 12.

By presenting on display screen 82 both the current backing path image 140 and the recovery path image 142 in a dynamic manner, system 10 can allow the driver of vehicle 14 to track or continuously assess not only the degree of the selected curvature and where such a curvature will direct the vehicle 14 and trailer 12 combination, if uninterrupted, but to simultaneously track a range of available travel of the vehicle 14 and trailer 12 combination. As can be seen in FIGS. 12 and 13, in particular, such presentation can provide a visualization of the recovery period R and the effect that an extended recovery period (e.g. over three vehicle lengths) can have on the space available for subsequent maneuvering. As illustrated in FIGS. 12 and 13, a tighter curvature command C2 and corresponding initial curvature K3 results in a longer recovery period R, which in the depicted example is less than the above-mentioned example threshold of three vehicle lengths.

To further assist a user of system 10 in identifying and, if needed, avoiding such extended recovery periods, system 10 can further present on display screen 82 various identified obstacles and other features surrounding vehicle 14. Such obstacles and features may be identified, for example by various collision mitigation features of vehicle including ultrasonic or electromagnetic sensors, or other object-detection mechanisms including radar, LIDAR, or the like, or that may be identified using one or more vehicle cameras, such as camera 46. Additionally, audible warnings can be presented through the speaker 81 associated with HMI 80 when a recovery period R is determined to be over the predetermined threshold. Still further, additional visual indications of a recovery period R determined to be over the predetermined threshold can be presented on display screen 82. For example, the color of recovery path 142 can change depending on a length range within which it falls. For example, a recovery path 142 of less than 1.5 vehicle lengths can be presented in green, a recovery path 142 of between 1.5 and 3 vehicle lengths can be presented in yellow, and a recovery path 142 of over 3 vehicle lengths can be presented in red (other color uses and combinations also being available. Still further, time indications (e.g. in seconds or factions of seconds) based on the current vehicle 14 speed and/or the calculated recovery path 142 can be presented therewith to allow the user to estimate the timing of subsequent maneuvers. As illustrated, the use of duplicate vehicle images in presenting both backing path 140 and recovery path 142 can allow a user to assess the length, particularly, of the recovery period. Similarly, in an embodiment in which either such path 140,142 is presented in lines or the like, tick marks 144 or other visual indications of length can be added to such lines.

Figure 14:
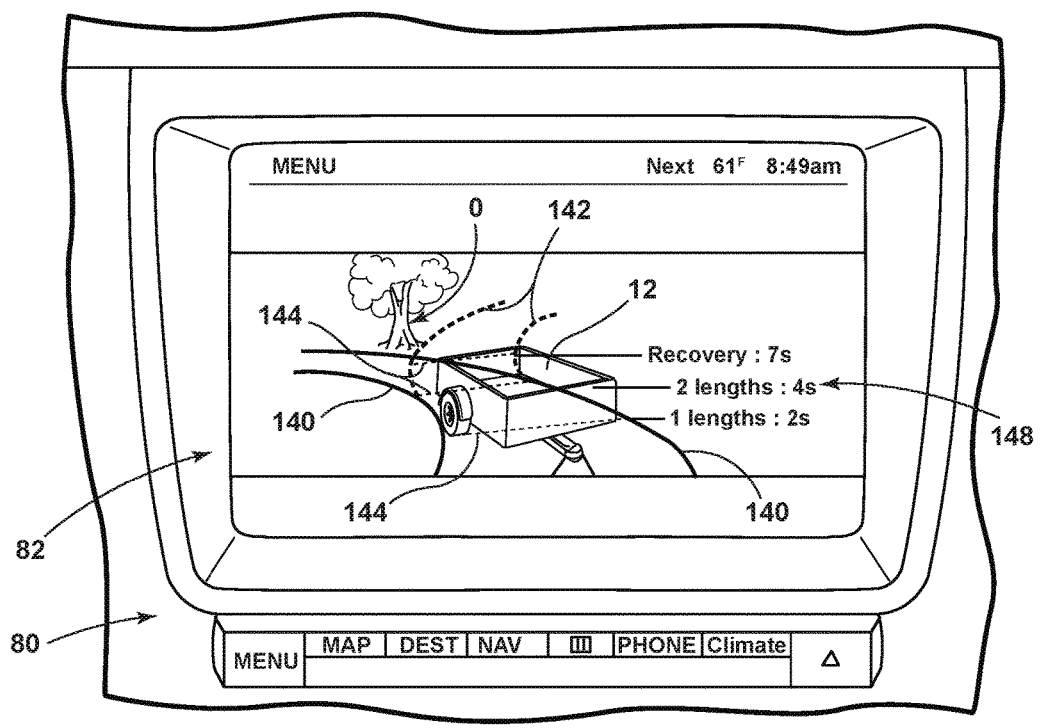
FIG. 14 is a detail view of the human-machine interface of FIG. 10 displaying information in relating to backing and recovery paths in an alternative format.

Turning now to FIGS. 14 and 15, a variation of the above-described visual communication of backing path 140 and recovery path 142 is shown presented as overlays on a video image taken to the rear of vehicle 14. Such an image can be taken by camera 46 mounted on the tailgate 48 of vehicle 14 (FIG. 1), for example. In one aspect, camera 46 can be a wide-angle (e.g. 180°) camera with field of view 50 sufficient to present a panoramic view to the rear of vehicle 14. Alternatively, the image can be supplemented by side cameras 47 mounted on the side view mirrors 49 of vehicle 14 and digitally stitched together and presented in a single panoramic image. Other camera locations and combinations are contemplated within the scope of the present disclosure.

In the embodiment, depicted in FIGS. 14 and 15, the backing path 140 and recovery path 142 can be estimated or calculated in the same manner as described above with respect to FIGS. 11-13. Further, recovery path 142 can be spatially plotted in a manner similar to that which is also discussed above. The depictions of backing path 140 and recovery path 142 are overlayed on the image provided by camera 46,47 with the derived paths and plots thereof being corrected for the perspective shown in the image based on the known positioning thereof along with the known characteristics of camera 46, including the focal length (and corresponding field of view angle) thereof. The length of both backing path 140 and recovery path 142 shown can be adjusted to correspond to the perspective of the image shown such that the portions thereof convey valuable information. For example, when depicted in multiple lines, the backing path 140 and recovery path 142 can be illustrated as pairs of lines corresponding to the width of vehicle 14 and/or trailer 12 and can terminate on display screen 82 prior to converging. Further, when backing path 140 and recovery path 142 include tick marks 144 or other visual time indicia, as illustrated, the displayed portions of backing path 140 and recovery path 142 can terminate before such features visibly run together, diminishing their usefulness.

Figure 11:
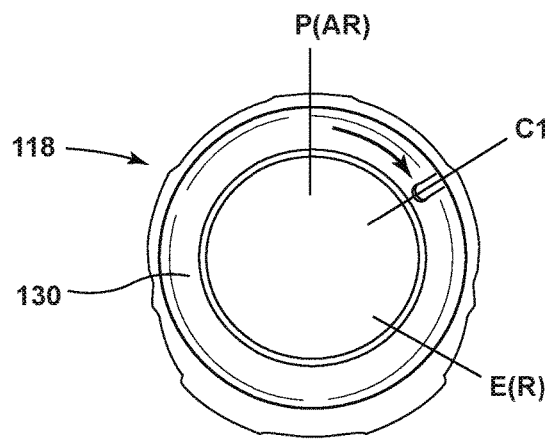
FIG. 11 is a top plan view of a steering input device including a rotatable knob commanding a curvature associated with the backing and recovery paths shown in FIG. 10.

As can be seen in FIGS. 14 and 15, the illustrated scheme can indicate a short recovery path 142 associated with a relatively larger curvature, such as the curvature associated with backing path 140 depicted in FIG. 14 and resulting from, for example, the curvature command C1 depicted in FIG. 11. Further, the illustrated scheme can also illustrate the effect on the recovery path 142 realized by a tighter curvature associated with backing path 140 depicted in FIG. 15 and resulting from, for example, the curvature command C2 depicted in FIG. 13. By overlaying backing path 140 and recovery path 142 with a real-time video image, the relationship between such paths and objects O surrounding vehicle 14 can also be seen. This can further aid a user in selecting a curvature that provides a recovery path R adequate for avoiding such objects or the desired placement of trailer 12 on or within certain objects visualized on display screen 82. Additionally, as discussed above, the overlay of backing path 140 and recovery path 142 can be accompanied by time-based information 148 derived from the calculations used to plot recovery path 142, for example. As also shown in FIG. 15, a visible warning 150 can also be displayed when a recovery path R is determined to have length above a predetermined threshold (e.g., three vehicle lengths, ten seconds, or the like). Additionally or alternatively, recovery path 142 can be depicted in various colors according to the recovery period length, as discussed above.

It is to be understood that variations and modifications can be made on the aforementioned structure without departing from the concepts of the present invention, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A backup assist system for a vehicle reversing a trailer coupled therewith, comprising:
   an input receiving a backing command corresponding with a desired non-zero vehicle-trailer curvature and outputting a control signal based on the desired vehicle-trailer curvature;
   a controller:
      receiving the control signal; and
      generating a vehicle steering command for achieving the desired vehicle-trailer curvature and calculating a zero-angle recovery distance from the desired vehicle-trailer curvature based on the control signal in parallel with generating the vehicle steering command; and
   an interface outputting an indication of the zero-angle recovery distance.

2. The system of claim 1, wherein:
   the controller further determines a backing path of the vehicle reversing the trailer based on the control signal; and
   the interface:
      includes a video screen displaying a trailer image and a backing path image; and
      outputs the indication of the zero-angle recovery distance as a recovery path image overlaid on the trailer image and the backing path image.

3. The system of claim 2, further including a camera capturing a video image of an area to a rear of the vehicle and including the trailer, wherein:
   the video screen presents the video image captured by the camera to display the image of the trailer, the backing path image and the recovery path image being digitally added to video image in an aligned manner therewith.

4. The system of claim 2, wherein the trailer image, the backing path image, and the recovery path image are presented by the interface as an overhead schematic view.

5. The system of claim 1, wherein:
   the control signal includes a direction and an amplitude; and
   the controller interprets the amplitude as a curvature command in the direction indicated by the control signal.

6. The system of claim 5, wherein:
   the controller determines a backing path for the vehicle in reversing the trailer to and along the curvature command in the direction indicated by control signal; and
   the zero-angle recovery distance is calculated based on an instantaneous theoretical divergence from the backing path in a direction opposite the direction indicated by the control signal and at a maximum controllable curvature.

7. The system of claim 6, wherein:
   the system is in communication with a speed sensor of the vehicle;
   the controller further determines a zero-angle recovery interval as a time period corresponding with the zero-angle recovery distance based on a detected vehicle speed received from the speed sensor; and
   the zero-angle recovery interval is a time determined to be required for the vehicle in moving along a corresponding recovery path to a point at which the angle between the vehicle and the trailer is zero.

8. A vehicle, comprising:
   a steering system;
   an input receiving a backing command for reversing a trailer coupled with a vehicle, the backing command including both a direction and a non-zero amplitude;
   a controller calculating a zero-angle recovery distance based on the amplitude of the backing command in-parallel with generating a steering command, and outputting the steering command to the steering system to cause an angle between the vehicle and the trailer to deviate from zero; and
   an interface outputting an indication of the zero-angle recovery distance.

9. The vehicle of claim 8, wherein:
   the controller further determines a backing path of the vehicle reversing the trailer based on the direction and amplitude of the backing command; and
   the interface:
      includes a video screen displaying a trailer image and a backing path image; and
      outputs the indication of the zero-angle recovery distance as a recovery path image on the trailer image and the backing path image.

10. The vehicle of claim 9, further including a camera capturing a video image of an area to a rear of the vehicle and including the trailer, wherein:
    the video screen presents the video image captured by the camera to display the trailer image, the backing path image and the recovery path image being digitally added to video image in an aligned manner therewith.

11. The vehicle of claim 9, wherein the trailer image, the backing path image, and the recovery path image are presented by the interface as an overhead schematic view.

12. The vehicle of claim 8, wherein the controller interprets the amplitude as a curvature command in the direction of the backing command.

13. The vehicle of claim 12, wherein:
    the controller determines the backing path for the vehicle in reversing the trailer to and along the curvature command in the direction of indicated by the backing command; and
    the zero-angle recovery distance is calculated based on an instantaneous theoretical divergence from the backing path in a direction opposite the direction of the backing command and at a maximum controllable curvature.

14. The vehicle of claim 13, wherein:
    the system is in communication with a speed sensor of the vehicle;
    the controller further determines a zero-angle recovery interval as a time period corresponding with the zero-angle recovery distance based on a detected vehicle speed received from the speed sensor; and
    the zero-angle recovery interval is a time determined to be required for the vehicle in moving along a corresponding recovery path to a point at which the angle between the vehicle and the trailer is zero.

15. A method for assisting in reversing a vehicle-trailer combination, comprising:
    receiving a control signal from an input corresponding to a directional backing command;
    generating a steering command based on the directional backing command;

outputting the steering command to a vehicle steering system to cause an angle between the vehicle and the trailer at a coupling point therebetween to deviate from zero;

in parallel with outputting the steering command, calculating a length of a zero-angle recovery distance based on the amplitude of the directional backing command; and outputting an indication of the zero-angle recovery distance via a vehicle interface.

16. The method of claim 15, further comprising determining a backing path of the vehicle-trailer combination based on the control signal, wherein:

outputting the length of the recovery period includes, on a video screen of the interface, displaying an image of at least a portion of the vehicle-trailer combination, a backing path image, and a recovery path image based on the zero-angle recovery distance on the image of the vehicle-trailer combination.

17. The method of claim 16, further including capturing a video image including at least a portion of the vehicle-trailer combination, wherein:

the image of at least the portion of the vehicle-trailer combination is the video image, and the backing path image and the recovery path image are digitally added to video image in an aligned manner therewith.

18. The method of claim 16, wherein the image of at least the portion of vehicle-trailer combination, the backing path image, and the recovery path image are presented on the video screen as an overhead schematic view.

19. The method of claim 15, further including determining a backing path for the vehicle-trailer combination to and along a curvature command corresponding with the control signal in a direction of control signal, wherein:

the recovery period is calculated based on an instantaneous theoretical divergence from the backing path in a direction opposite the direction indicated by the control signal and at a maximum controllable curvature.

20. The method of claim 19, further including determining a zero-angle recovery interval as a time period corresponding with the zero-angle recovery distance based on a detected vehicle speed;

wherein the zero-angle recovery interval is a time determined to be required for the vehicle in moving along the recovery path to a point at which the angle between the vehicle and the trailer is zero.

* * * * *